(12) United States Patent
Gouko et al.

(10) Patent No.: US 11,193,900 B2
(45) Date of Patent: Dec. 7, 2021

(54) HEAT FLOW MEASUREMENT APPARATUS

(71) Applicants: DENSO CORPORATION, Kariya (JP); TOYOTA JIDOSHA KABUSHIKI KAISHA, Toyota (JP)

(72) Inventors: Norio Gouko, Kariya (JP); Toshihisa Taniguchi, Kariya (JP); Atusi Sakaida, Kariya (JP); Keiji Okamoto, Kariya (JP); Yoshihiko Shiraishi, Kariya (JP); Masahiro Asano, Kariya (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 482 days.

(21) Appl. No.: 16/304,040

(22) PCT Filed: May 16, 2017

(86) PCT No.: PCT/JP2017/018342
§ 371 (c)(1),
(2) Date: Nov. 21, 2018

(87) PCT Pub. No.: WO2017/204034
PCT Pub. Date: Nov. 30, 2017

(65) Prior Publication Data
US 2020/0182811 A1 Jun. 11, 2020

(30) Foreign Application Priority Data
May 25, 2016 (JP) .............................. JP2016-104501

(51) Int. Cl.
*G01K 17/00* (2006.01)
*G01N 25/18* (2006.01)
*G01K 17/20* (2006.01)

(52) U.S. Cl.
CPC ............. *G01N 25/18* (2013.01); *G01K 17/20* (2013.01)

(58) Field of Classification Search
CPC combination set(s) only.
See application file for complete search history.

(56) References Cited

U.S. PATENT DOCUMENTS

| 7,699,520 B2 * | 4/2010 | Yoo ........................ G01K 17/20 374/29 |
| 2005/0169344 A1 * | 8/2005 | Hutter ..................... G01K 7/021 374/14 |

(Continued)

FOREIGN PATENT DOCUMENTS

| JP | 2011187619 A | 9/2011 | |
| JP | 2015013636 A | * 1/2015 | ............. G01K 17/20 |
| JP | 2016011950 A | 1/2016 | |

OTHER PUBLICATIONS

EPO Translation of JP2015013636 (Year: 2015).*

*Primary Examiner* — Lisa M Caputo
*Assistant Examiner* — Nasir U. Ahmed
(74) *Attorney, Agent, or Firm* — Harness, Dickey & Pierce, P.L.C.

(57) ABSTRACT

A heat flow measurement apparatus is provided with a heat flux sensor and a thermocouple sheet. The heat flux sensor includes an insulation substrate, a plurality of interlayer connection members, a front surface wiring pattern, a back surface wiring pattern, a front surface protective member and a back surface protective member. The thermocouple sheet includes a thermocouple, a first insulation sheet and a second insulation sheet, and is fixed to a portion where the front surface protective member and the back surface protective member extend in a surface direction from the insulation substrate.

7 Claims, 18 Drawing Sheets

(56) References Cited

U.S. PATENT DOCUMENTS

| | | | |
|---|---|---|---|
| 2009/0175314 A1* | 7/2009 | Hollander | G01K 1/14 374/137 |
| 2016/0129817 A1* | 5/2016 | Shimizu | B60H 1/2227 219/202 |
| 2017/0082564 A1 | 3/2017 | Shirasishi et al. | |

* cited by examiner

HEAT FLOW MEASUREMENT APPARATUS

CROSS-REFERENCE TO RELATED APPLICATIONS

This application is a U.S. National Phase Application under 35 U.S.C. 371 of International Application No. PCT/JP2017/018342 filed on May 16, 2017. This application is based on and claims the benefit of priority from Japanese Patent Application No. 2016-104501 filed May 25, 2016 The entire disclosures of all of the above applications are incorporated herein by reference.

FIELD

The present disclosure relates to a heat flow measurement apparatus integrating a heat flux sensor and a thermocouple.

BACKGROUND

Conventionally, a heat flux sensor is known. The heat flux sensor is formed in a thin plate-like shape, outputting a signal in response to heat flux flowing through two surfaces between one side surface and the other side surface in a thickness direction thereof.

Patent literature 1 discloses a heat flux measurement apparatus in which an electrically isolated plurality of heat flux sensors are simultaneously formed in a manufacturing process producing one multi layered substrate. This heat flux measurement apparatus is configured to minimize individual differences in performance of a plurality of heat flux sensors.

PATENT LITERATURE

PTL 1 JP-A-2016-11950

The heat flow measurement apparatus according to PTL 1 is able to measure heat produced inside an object to be measured by being attached to a surface of the object. However, heat flow on the surface of the object to be measured is influenced by heat produced inside the object and also a change in the outside temperature. Hence, the heat flow measurement apparatus outputs a signal responding to heat produced inside the object to be measured and a signal responding to a change in the outside temperature. Hence, according to a heat flow measurement where the heat flow apparatus is attached to the surface of the object to be measured, the signal responding to a change in the outside temperature is regarded as a temperature drift. Therefore, it is difficult to detect heat produced inside the object to be measured.

As a countermeasure, a thermocouple may be provided to the heat flow measurement apparatus in addition to the heat flux sensor. When detecting a temperature change on the surface of the object due to a change in the outside temperature by using the thermocouple, an influence of the temperature drift can be removed from the signal of the heat flux sensor.

In the case where a heat flux sensor and a thermocouple are provided in the heat flow measurement apparatus, the following problem may arise.

(1) When it is assumed that the heat flux sensor and the thermocouple are stuck in a thickness direction, the thickness of the heat flow measurement apparatus becomes large. In the case where such a heat flow measurement apparatus is attached to the surface of the object to be measured, turbulence of air flow occurs in the vicinity of the object to be measured. Hence, the output signal of the heat flux sensor and the output signal of the thermocouple do not accurately correspond to thermal flow on the surface of the object to be measured which is caused by heat produced inside the object or thermal flow on the surface of the object to be measured, due to a change in the outside temperature. Accordingly, when such an arrangement is used, it is difficult for the heat flow measurement apparatus to accurately detect heat produced inside the object to be measured.

(2) When it is assumed that the heat flux sensor and the thermocouple are arranged apart from each other in a surface direction, heat flow detected by the heat flux sensor and a temperature change detected by the thermocouple reflect different locations of the objects. In this case, the signal of the thermocouple do not correspond to the signal of the heat flux sensor. Therefore, even in this arrangement, it is difficult for the heat flow measurement apparatus to reduce the influence of temperature drift from the signal of the heat flux sensor.

SUMMARY

Hence it is desired to provide a heat flow measurement apparatus capable of accurately detecting a heat flow of a measurement object.

As a first aspect of the present disclosure, a heat flow measurement apparatus includes a heat flux sensor and a thermocouple sheet.

The heat flux sensor includes an insulation substrate having a plate shape, a plurality of conductors composed of metals having mutually different thermoelectric powers and embedded into a plurality of via holes penetrating in a thickness direction of the insulation substrate, a front surface wiring pattern that connects end portions of the plurality of conductors on one side of the insulation substrate in a thickness direction thereof, a back surface wiring pattern that connects end portions of the plurality of conductors on the other side of the insulation substrate in the thickness direction thereof, a front surface protective member that covers one surface of the insulation substrate in the thickness direction and the front surface wiring pattern, and a back surface protective member that covers the other surface of the insulation substrate in the thickness direction and the back surface wiring pattern, the flux sensor detecting a heat flux flowing between the one surface and the other surface in the thickness direction.

The thermocouple sheet includes a thermocouple having a joint in which a first conductor and a second conductor are joined, the first and second conductors being metals having mutually different thermoelectric power, a first insulation sheet that covers the thermocouple from one side in a direction intersecting a direction along which the first conductor and the second conductor are arranged, and a second insulation sheet that covers the thermocouple from a side opposite to the first insulation sheet, the thermocouple detecting temperature of the junction.

The thermocouple sheet is fixed to a portion where the front surface protective member and the back surface protective member extend in a surface direction from the insulation substrate.

Thus, comparing with a case where the heat flux sensor and the thermocouple are arranged to be laminated in the thickness direction, the thickness of the heat flux measurement apparatus can be thinner. Hence, when the heat flux measurement apparatus is attached to the surface of the measurement object, air flow in the vicinity of the surface of the measurement object can be prevented from being disturbed. Therefore, the heat flux measurement apparatus is able to reduce temperature drift due to a change in the outside temperature or the like, based on the output signal of the heat flux sensor and the output signal of the thermocouple, so that the heat flow of the measurement object can be accurately measured.

Also, the heat flux sensor and the thermocouple 20 can be provided to be at a close position. Hence, each of the heat flux sensor and the thermocouple detects the heat flow and the temperature at almost the same position of the measurement object. Accordingly, the signal of the thermocouple corresponds to the signal of the heat flux sensor. As a result, the heat flow measurement apparatus is able to reduce the influence of the temperature drift from the signal of the heat flux sensor.

DRAWINGS

The above-described object and other objects, features and advantages in connection with the present disclosure will become more evident by the following detailed description with reference to accompanying drawings.

DESCRIPTION

Hereinafter, with reference to the drawings, embodiments of the present invention will be described. It should be noted that mutually identical or equivalent parts in the following embodiments will be described with the same reference symbols.

First Embodiment

Figure 1:
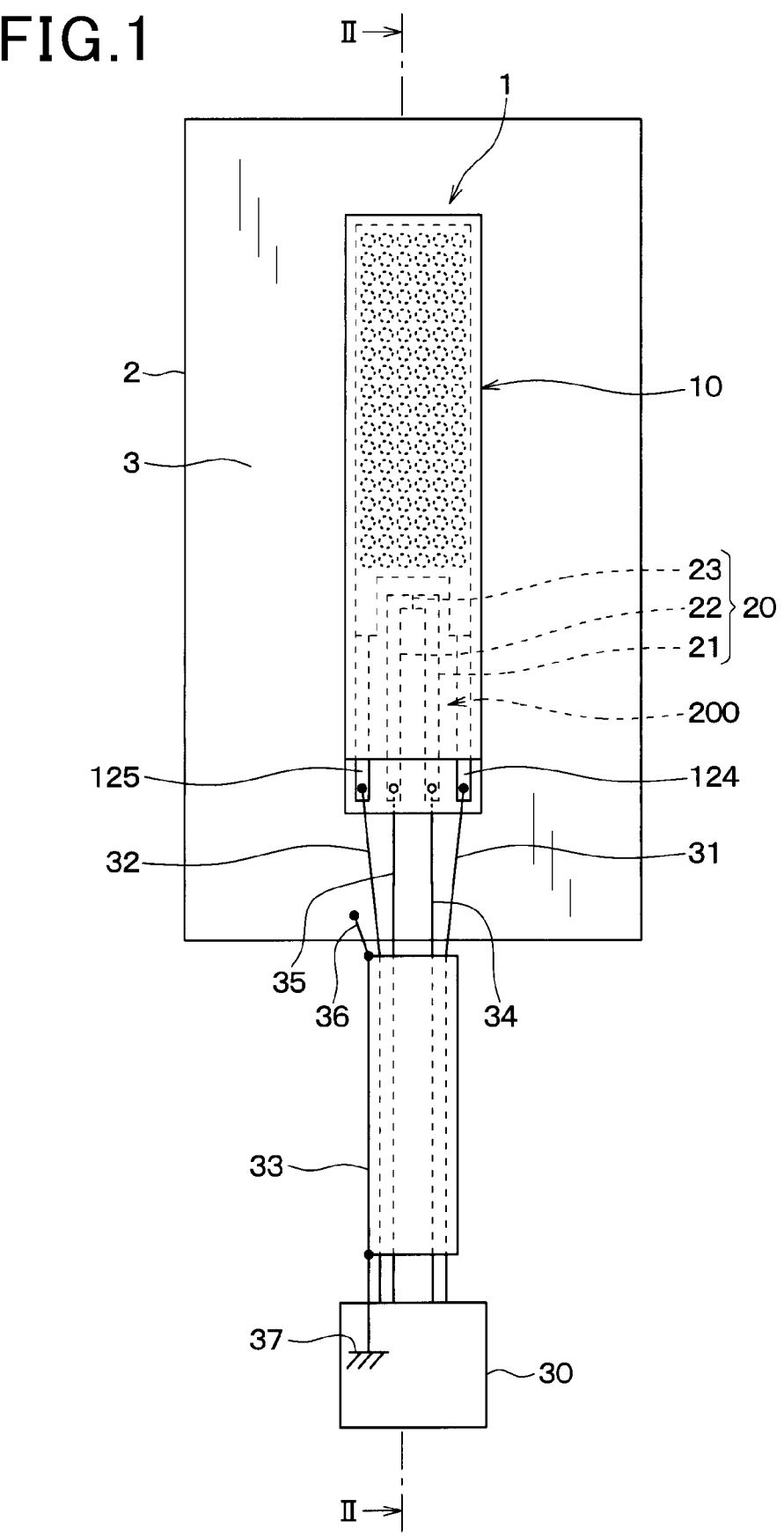
FIG. 1 is a diagram schematically showing a state where a heat flow measurement apparatus according to a first embodiment of the present invention is attached to an object to be measured.
Figure 2:
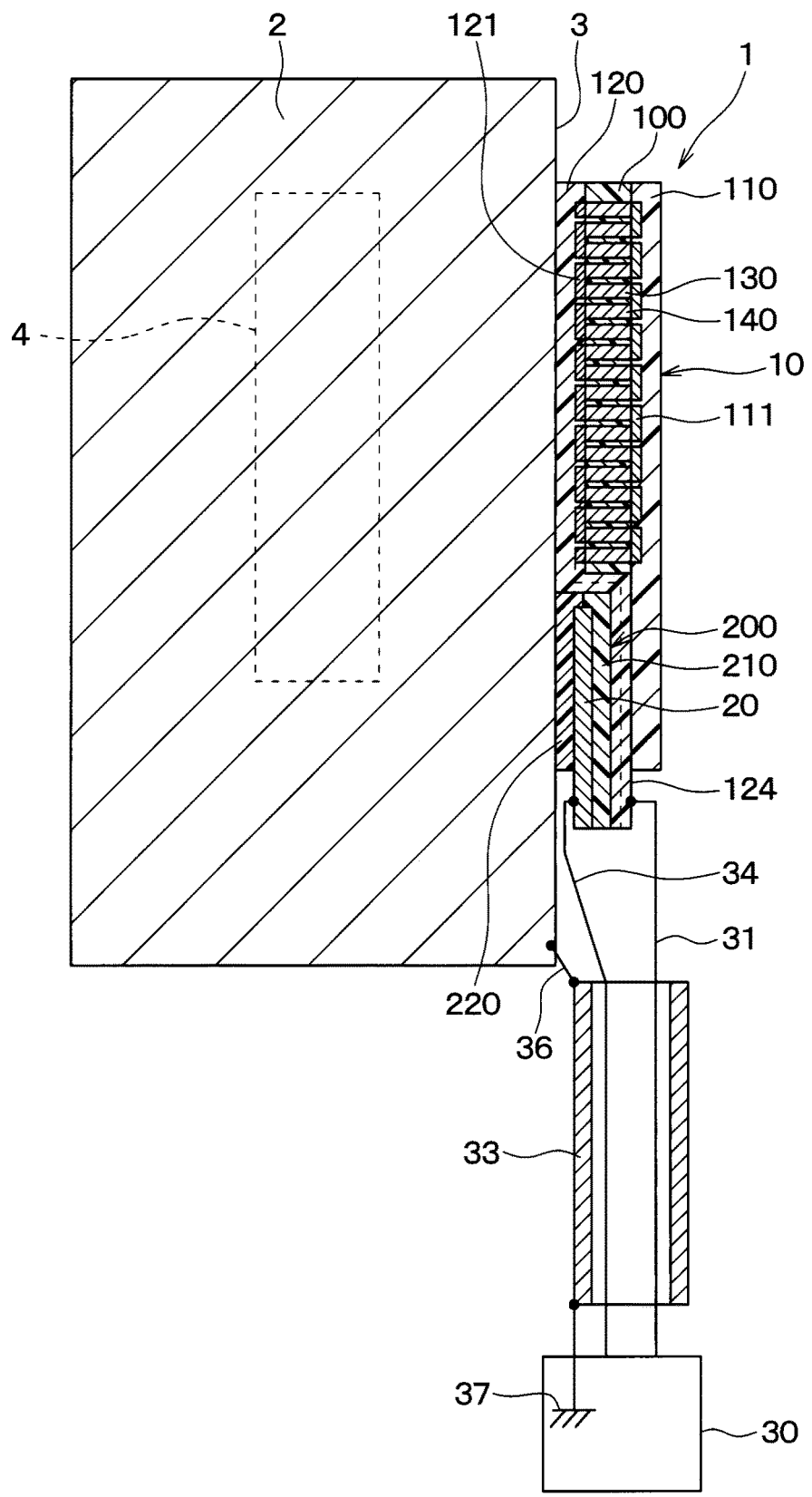
FIG. 2 is a schematic diagram of a cross-sectional view sectioned along the line II-II shown in FIG. 1.

With reference to the drawings, a first embodiment of the present invention will be described. As shown in FIGS. 1 and 2, a heat flow measurement apparatus 1 according to the present embodiment is configured to integrate a heat flux sensor 10 and a thermocouple 20.

The heat flux sensor 10 includes an insulation substrate 100, a front surface protective member 110 that covers one surface of the insulation substrate 100 in a thickness direction, and a back surface protective member 120 that covers the other surface thereof. The insulation substrate 100 includes a plurality of interlayer connection members 130 and 140 composed of metals having mutually different thermoelectric power to produce Seebeck effect, the interlayer connection members being embedded to the insulation substrate 100. The front surface protective member 110 and the back surface protective member 120 includes a front surface wiring pattern 111 and a back surface wiring pattern 121 formed thereon respectively, in order to serially connect a plurality of interlayer connection members 130 and 140. The heat flux sensor 10 outputs a signal responding to thermo-electromotive force produced between the interlayer connection members 130 and 140 in accordance with the heat flux flowing between the one surface and the other surface in the thickness direction. Note that the thickness direction of the heat flux sensor 10 is defined as a lamination direction of the insulation substrate 100, the front surface protective member 110 and the back surface protective member 120. The interlayer connection member 130 and 140 corresponds to conductor in claims.

The thermocouple sheet 200 includes a thermocouple 200, a first insulation sheet 210 and a second insulation sheet 220. The thermocouple 20 is composed of a first conductor 21 and a second conductor 22 which are joined to each other. Respective first and second conductor 21 and 22 are configured of metallic foil having mutually different thermoelectric powers. A part where the first conductor 21 and the second conductor 22 are joined is referred to as a junction 23. The thermocouple 20 outputs a signal responding to the thermo-electromotive force produced at the thermocouple 20 in accordance with a temperature difference between the junction 23 and a detecting portion 30 connected to the first and second conductors 21 and 22 via a wiring 34 and a wiring 35. The first insulation sheet 210 covers the thermocouple 20 from one side in a direction intersecting a direction along which the first conductor 21 and the second conductor 22 are arranged. The second insulation sheet 220 covers the thermocouple 20 from an opposite side with respect to the first insulation sheet 210. Detailed configuration of the heat flux sensor 10 and the thermocouple sheet 200 will be described later.

The heat flow measurement apparatus 1 can be used being attached to a surface 3 of a measurement object 2. Note that a heat source 4 inside the measurement object 2 is schematically shown with a dotted line.

The wirings 31 and 32 each being connected to pads 124 and 124 of a terminal portion of the back surface wiring pattern 121 included in the heat flux sensor 10 is connected to the detecting portion 30 passing through inside a shielding wire 33 having a tube shape. Also, the wirings 34 and 35 each being connected to the first conductor 21 and the second conductor 22 included in the thermocouple 20 is connected to the detecting portion 30 passing through inside the shielding wire 33. Thus, the output signal of the hear flux sensor 10 and the output signal of the thermocouple 20 are inputted to the detecting portion 30.

The detecting portion 30 is configured of a microcomputer and periphery devices or the like. The detecting portion 30 detects a heat flow of the measurement object 2 based on the output signal of the heat flow sensor 10 and the output signal of the thermocouple 20. Specifically, heat produced in the heat source 4 in the measurement object 2 is propagated to the surface 3 through the inside of the measurement object 2 and the detecting portion 30 detects the heat flow on the surface 3 of the measurement object 2. The detecting portion 30 may be configured to calculate heat quantity produced in the heat source 4 of the measurement object 2, based on the measured heat flow on the surface 3 of the measurement object 2.

The shielding wire 33 has a conductor for preventing electromagnetic waves from entering into the heat flow measurement apparatus 1 from outside. The conductor included in the shielding wire 33 is formed in a cylindrical shape to surround the wiring inside the shielding wire 33, and electrically connected to the measurement object 2 via the wiring 36 or the like. The conductor included in the shielding wire 33 may preferably be connected to the ground 37. Thus, noise influencing the voltage signal outputted by the heat flux sensor 10 and the thermocouple 20 can be reduced.

Figure 3:
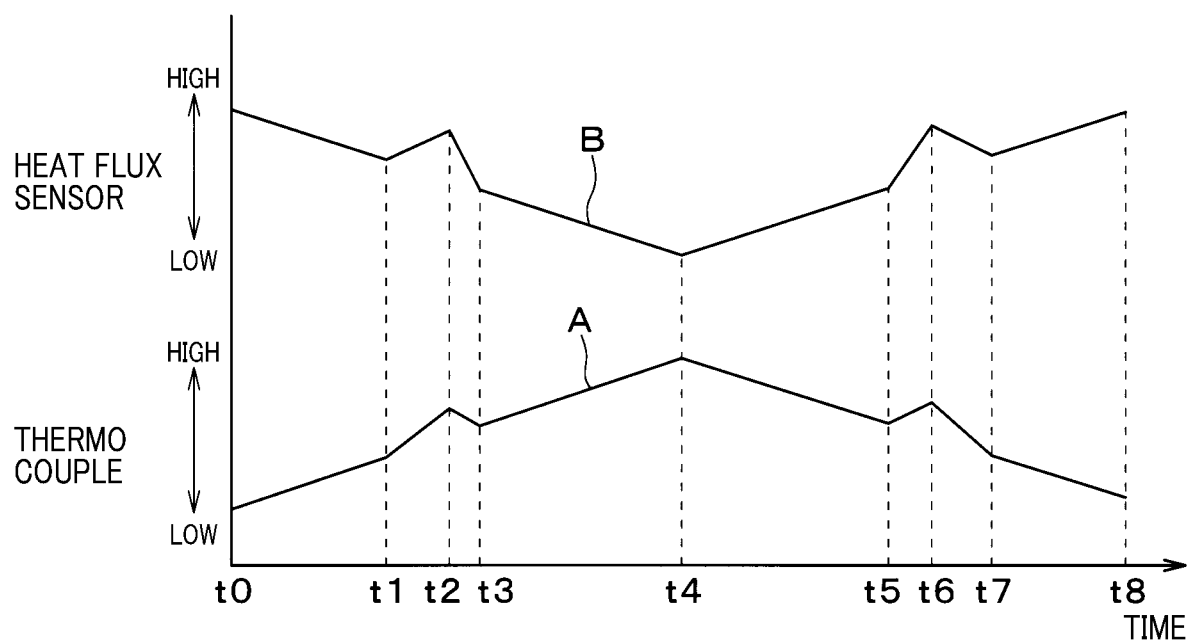
FIG. 3 is a graph schematically showing output characteristics of a heat flux sensor and a thermocouple which compose the heat flow measurement apparatus.

FIG. 3 schematically illustrates an example of an output signal of the thermocouple 20 detected at the detecting portion 30 with a solid line A, and together with an example of an output signal of the thermocouple with a solid line B.

In this example, the outside temperature gradually increases from time t0 to time t4, and gradually decreases from time t4 to time t8. The temperature at the detecting portion 30 is constant over a period from time t0 to time t8.

The temperature at the surface 3 of the measurement object 2 increases in accordance with an increase of the outside temperature and decreases in accordance with a decrease of the outside temperature. Therefore, as shown in solid line A, the output signal of the thermocouple 20 gradually increases from time t0 to time t4 and gradually decreases from time t4 to time t8.

On the other hand, the heat flux on the surface 3 of the measurement object 2 flows inward in the measurement object 2 side from outside when the outside temperature increases, and flows outward from the measurement object 2 side when the outside temperature decreases. Hence, as shown in solid line B, the output signal of the heat flux sensor 10 gradually falls from time t0 to time 4, and gradually rises from time t4 to time t8. That is, the output signal of the thermocouple 30 and the output signal of the heat flux sensor 10 show opposite behaviors responding to a change in the outside temperature with respect to the heat flux on the surface 3 of the measurement object 2.

Assuming that heat is produced at the heat source 4 in the measurement object 2 during a period from t1 to t2 and a period from t5 to t6, the heat produced at the heat source 4 is propagated to the surface 3 from inside the measurement object 2. Hence, both of the output signal of the thermocouple 20 and the output signal of the heat flux sensor 10 rise during a period from time t1 to time t2, and falls during a period from time t2 to time t3. Moreover, both of the output signal of the thermocouple 20 and the output signal of the heat flux sensor 10 rise during a period from time t5 to time t6, and falls during a period from time t6 to time t7. In other words, the output signal of the thermocouple 20 and the output signal of the heat flux sensor 10 represents behavior of heat transfer in the same direction with respect to the heat flow on the surface 3 of the measurement object 2, in which heat produced at the heat source 4 in the measurement object 2 is propagated through inside the measurement object 2.

Accordingly, the detecting portion 30 compares the output signal of the heat flux sensor 10 with the output signal of the thermocouple 20 so that heat flow on the surface 3 of the measurement object 2 due to a change in the outside temperature is removed, whereby the detecting portion 30 is able to measure only the heat flow of the surface 3 of the measurement object 2 due to the heat produced in the heat source 4 in the measurement object 2.

Next, configuration of the heat flux sensor 10 and the thermocouple sheet 200 included in the heat measurement apparatus 1 will be described.

Figure 4:
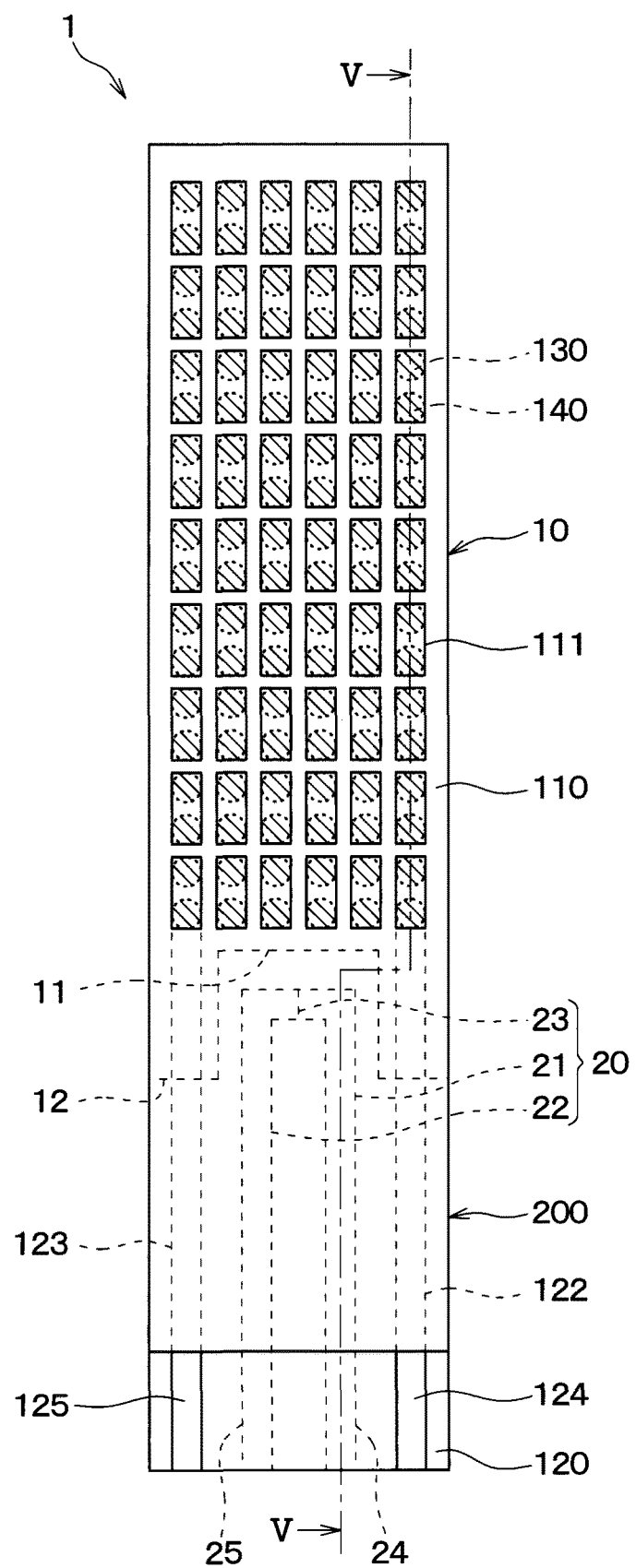
FIG. 4 is a plan view of the heat flow measurement apparatus according to the first embodiment.
Figure 5:
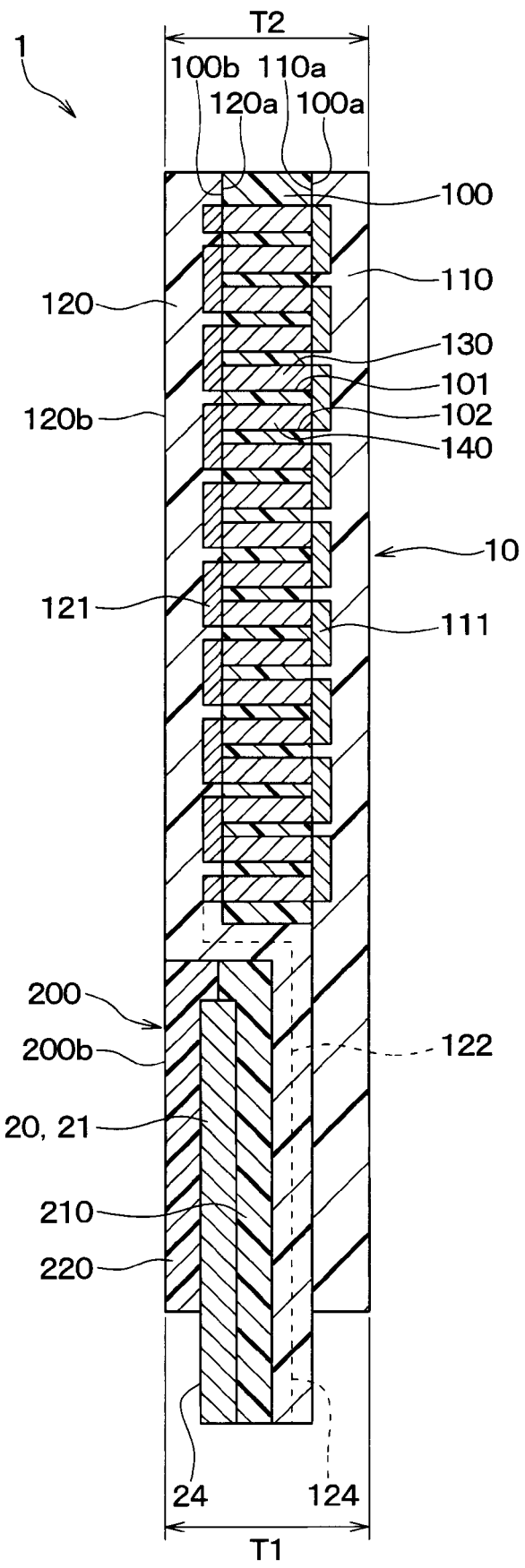
FIG. 5 is a cross-sectional view sectioned along the line V-V shown in FIG. 4.

As shown in FIGS. 4 and 5, the heat flux sensor 10 is configured to integrate the insulation substrate 100, the front surface protective member 110, the back surface protective member 120, in which a first interlayer connection member 130 and a second interlayer connection member 140 are alternately connected in series.

The insulation substrate 100 is constituted of a thermoplastic resin film having flexibility or a thermosetting resin, and formed in a plate shape. The insulation substrate 100 includes a plurality of first via holes 101 and a plurality of second via holes 102, being formed to penetrate in the thickness direction thereof.

In each of the first via holes, the first interlayer connection member 130 is embedded therein, and in the second via holes 102, the second interlayer connection member 140 is embedded therein. In other words, in the insulation substrate 100 the first interlayer connection member 130 and the second interlayer connection member 140 which are alternately embedded.

The first interlayer connection member 130 and the second interlayer connection member 140 are constituted of thermo electric material such as metals having mutually different thermoelectric power to produce Seebeck effect, or a semiconductor. For example, the first interlayer connection member 130 is constituted of metal compound in which P-type Bi—Sb—Te alloy powder is solid-state sintered such that crystal structure of a plurality of metal atoms before sintering is maintained. Moreover, for example, the second interlayer connection member 140 is constituted of metal compound in which N-type Bi—Te alloy powder is solid-state sintered such that crystal structure of a plurality of metal atoms before sintering is maintained.

Note that the first and second interlayer connection members 130 and 140 are invisible in FIG. 4 because they are hidden by the front surface wiring pattern 111 which will be described later. However, for convenience of explanation, positions of the first and second interlayer connection members 130 and 140 are shown with a dotted line and a hatching.

The front surface protective member 110 covers a surface 100a of the insulation substrate 100a. The front surface protective member 110 is constituted by a thermo plastic resin film having flexibility or thermosetting resin film. Also, the front surface protective member 110 is formed to have a length longer than that of the insulation substrate 100 in one surface direction and extends in the one surface direction.

For the front surface protective member 110, a plurality of front surface wiring patterns 111 are formed on a surface 110a side that faces the insulation substrate 100, the surface wiring pattern being patterned with copper film or the like. Note that since the front surface protective member 110 is transparent or semitransparent, the plurality of front surface wiring patterns 111 are shown with a solid line in FIG. 4. Each of the plurality of front surface wiring patterns 111 electrically connects one end portion of the first interlayer connection member 130 and one end portion of adjacent second interlayer connection member 140.

The back surface protective member 120 covers the back surface 100b of the insulation substrate 100. The back surface protective member 120 is constituted of a thermo plastic resin film having flexibility or a thermosetting resin film. The back surface protective member 120 is formed to have a length longer than that of the insulation substrate 100 in one surface direction and extends in the one surface direction.

For the front surface protective member 120, a plurality of back surface wiring patterns 121 are formed on a surface 120a side that faces the insulation substrate 100, the back surface wiring pattern being patterned with copper film or the like. Each of the plurality of back surface wiring patterns 111 electrically connects one end portion of the first interlayer connection member 130 and one end portion of adjacent second interlayer connection member 140.

The mutually adjacent first interlayer connection member 130 and the second interlayer connection member 140 are connected by the front surface wiring pattern 111 and the back surface wiring pattern 121 such that the first and second interlayer connection members 130 and 140 are alternately folded. Thus, the first interlayer connection member 130 and the second interlayer connection member 140 are connected in series by the front surface wiring pattern 111 and the back surface wiring pattern 121.

Extension wirings 122 and 123 which are end portions of the serially connected first and second interlayer connection members 130 and 140 among the back surface wiring pattern 121, are provided in a portion where the back surface protective member 120 extends in one surface direction with respect to the insulation substrate 100. The extension wirings 122 and 123 of the back surface wiring pattern 121 are exposed to outside air at a portion where the back surface protective member 120 further extends with respect to the front surface protective member 110. The portion where the extension wirings 122 and 123 are exposed to the outside air serves as the pads 124 and 125 used for terminals to which wirings is connected.

The heat flux sensor 10, when heat flux is produced between one surface and the other surface in the thickness direction, produces a temperature difference between the one end portion and the other end portion of the first and second interlayer connection members 130 and 140. At this moment, thermoelectromotive force is produced by Seebeck effect between the first and the second interlayer connection members 130 and 140. The heat flux sensor 10 outputs the thermoelectromotive force as a sensor signal (e.g. voltage signal).

Subsequently, a configuration of the thermocouple sheet 200 will be described.

The thermocouple sheet 200 is configured to integrate the thermocouple 20, the first insulation sheet 210 and the second insulation sheet 220. The thermocouple 20 is configured such that the first conductor 21 and the second conductor 22 composed of metals having mutually different thermoelectric power are joined by welding or the like so as to produce Seebeck effect. A portion where the first and the second conductors 11 and 12 are joined serves as the junction 23. Note that each of the first conductor 21 and the second conductor 22 according to the preset embodiment is configured of metallic foil.

The first insulation sheet 210 is constituted by a thermoplastic resin film having flexibility or a thermosetting resin film, the first insulation sheet 210 being formed in a plate like shape. The first insulation sheet 210 covers the thermocouple 20 from one side in a direction intersecting a direction where the first conductor 21 and the second conductor 22 are arranged. The second insulation sheet 220 covers the thermocouple 20 from an opposite side of the first insulation sheet 210. The first insulation sheet 210 is formed to have a length longer than that of the second insulation sheet 220 in one surface direction, and extends in the one surface direction from the second insulation sheet 220.

At a portion where the first insulation sheet 210 extends with respect to the second insulation sheet 220, the first conductor 21 and the second conductor 22 constituting the thermocouple 20 is exposed to the outside air. The portion where the first and second conductors 21 and 22 are exposed to the outside air serves as the pads 24 and 25.

In the thermocouple 20, when temperature difference is produced between the junction 23 and the detecting portion 30, thermo-electromotive force is generated at the junction 23 due to the Seebeck effect. The thermocouple 20 outputs the thermo-electromotive force as a sensor signal (for example, voltage signal).

The thermocouple sheet 200 is fixed to a portion where the front surface protective member 110 and the back surface protective member 120 extend in the surface direction from the insulation substrate 100. The insulation substrate 100 that constitutes the heat flux sensor includes a concave portion 11 recessed to the interlayer connection members 130 and 140 from an edge 12 of a thermocouple sheet 200 side. The junction 23 of the thermocouple 20 included in the thermocouple sheet 200 enters the concave portion 11 included in the insulation substrate 100. Hence, a distance between the first and second interlayer connection members 130 and 140 of the heat flux sensor 10, and the junction 23 of the thermocouple 20 is short.

Also, according to the present embodiment, the back surface protective member 120 is bent towards a front surface protective member 110 side in a portion extending in the surface direction from the insulation substrate 100, and contacts with the front surface protective member 110. The thermocouple sheet 200 is fixed to the back surface protective member 120 at a surface opposite to the front surface protective member 110 in a portion where the back surface protective member 120 contacts with the front surface protective member 110. With this state, a surface 120b and a surface 200b are flush with each other, where the surface 120b is a surface opposite to the insulation substrate 100 in the back surface protective member 120 at a portion where the plurality of interlayer connection members 130 and 140 are located in the heat flux sensor 10, and a surface 200b is a surface opposite to the back surface protective member 120 in the thermocouple sheet 200 at a portion where the junction 23 is located.

In the present specification, expression "two surfaces are flush with each other" includes not only a state where the two surfaces are flush with each other on the identical plane, but also a state where the two surfaces are slightly shifted from each other because of fabrication tolerance or aging.

The thickness of the thermocouple sheet 200 is the same as that of the insulation substrate 100 or thinner. Hence, according to the heat flow measurement apparatus 1, the thickness T1 at a portion where the thermocouple sheet 200 is provided, is within a range of the thickness T2 at a portion where the heat flux sensor 10 is provided.

Next, a manufacturing method of a heat flux measurement apparatus 1 will be described. Note that the manufacturing method is used for simultaneously manufacturing a plurality of heat flow measurement apparatus.

Figure 6:
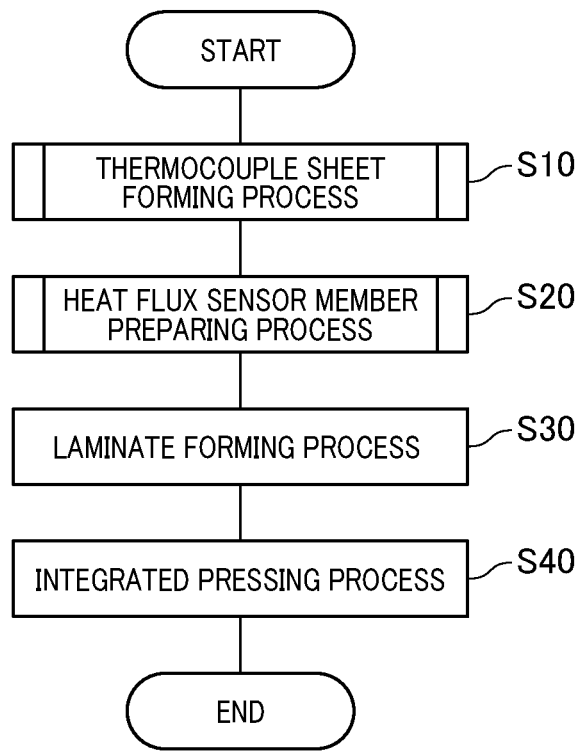
FIG. 6 is a flowchart of a manufacturing method of the heat flow measurement apparatus according to the first embodiment.

As shown in FIG. 6, the manufacturing method includes a thermocouple sheet forming process S10, a heat flux sensor member preparing process S20, a laminate forming process S30 and an integrated pressing process S40.

Figure 7:
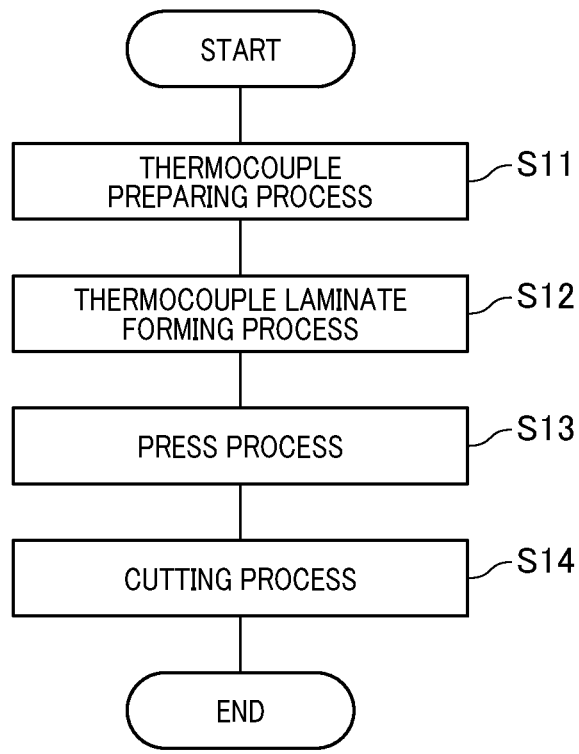
FIG. 7 is a flowchart of a manufacturing method of a thermocouple sheet that composes the heat flow measurement apparatus.

In the manufacturing method of the heat flux measurement apparatus 1, thermocouple sheet forming process S10 will be described. In the thermocouple sheet forming process S10, with a thermocouple preparing process S11, a thermocouple laminate forming process S12, a press process S13 and a cutting process S14 are performed shown in FIG. 7, thereby forming the thermocouple sheet 200.

In the thermocouple preparing process S11, the first conductor 21 and the second conductor 22 configured of metallic foil having mutually different thermoelectric power are prepared, and their tip end portions are joined by welding, thereby forming the junction 23.

Figure 8:
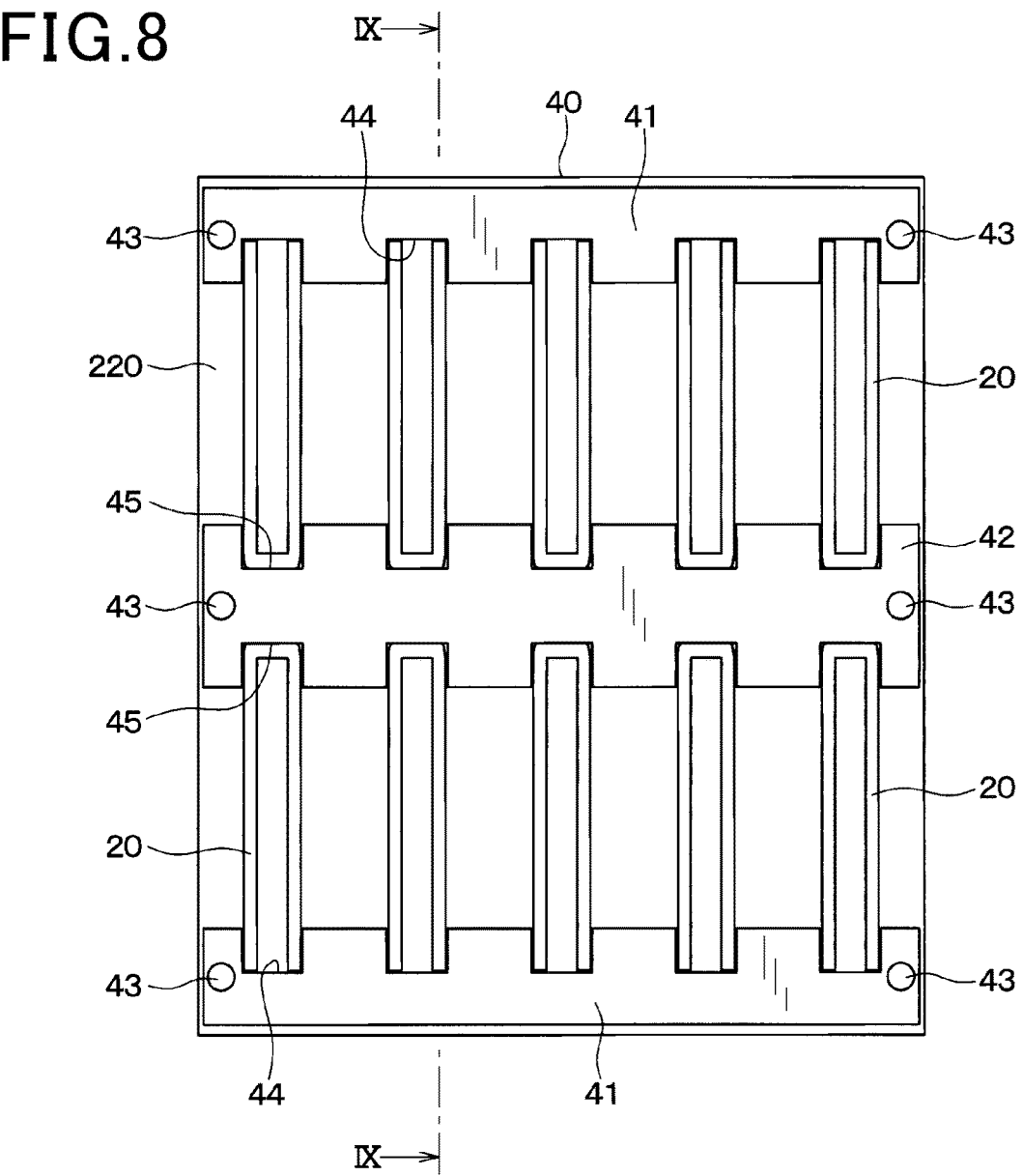
FIG. 8 is an explanatory diagram of the manufacturing method of a thermocouple sheet that composes the heat flow measurement apparatus.
Figure 9:
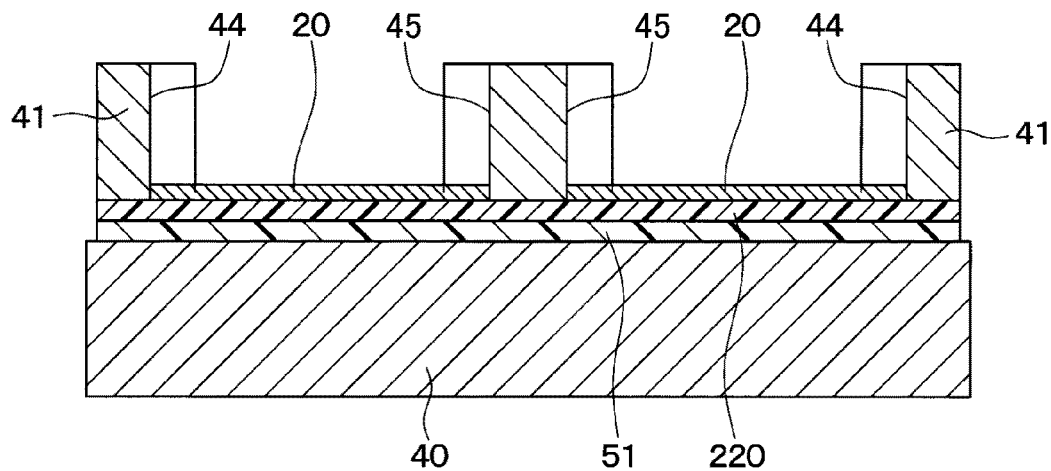
FIG. 9 is a cross-sectional view sectioned along the line IX-IX shown in FIG. 8.

Next, in the thermocouple laminate forming process S12, as shown in FIGS. 8 and 9, a first release paper 51 and a second insulation sheet 220 are placed on a jig base 40 formed to have predetermined size. Further, an end portion alignment jig 41 and an intermediate positional alignment jig 42 are fixed to the jig base 40 from the above by using a bolt 43. As the first release paper 51, a thermo setting resin sheet or a thermo plastic resin sheet formed of aramid resin or the like is used for example. As the second insulation sheet 220, a thermo setting resin sheet or a thermo plastic resin sheet formed of aramid resin having adhesive layer on a front surface or a back surface are used. Also, for the end portion alignment jig 41 and an intermediate positional alignment jig 42, a plurality of grooves 44 and 45 are formed to positionally align the thermocouple 20. A plurality of thermocouples 20 are arranged on the second insulation sheet 220 as being aligned with the plurality of grooves 44 and 45. Note that the plurality of thermocouples 20 are arranged in a direction where the grooves 44 and 45 respectively provided in the end portion alignment jig 41 and an intermediate positional alignment jig 42, and arranged facing each other via the intermediate positional alignment jig 42.

Figure 10:
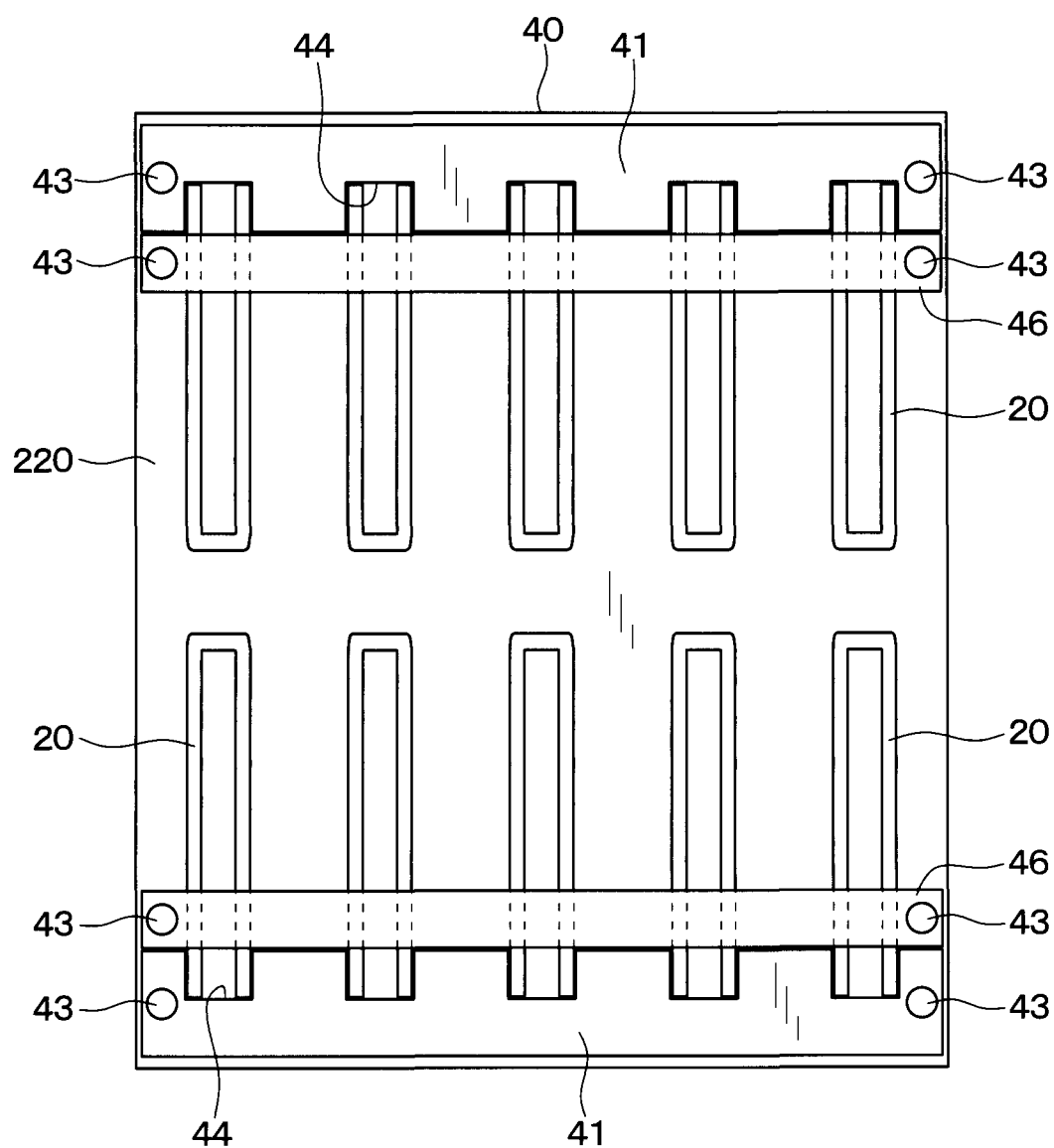
FIG. 10 is an explanatory diagram of the manufacturing method of the thermocouple sheet that composes the heat flow measurement apparatus.

Subsequently, as shown in FIG. 10, a pressing jig 46 is fixed to the jig base 40 via a bolt 43 from above the first release paper 34 51, the second insulation sheet 220 and the thermocouple 20. Thus, the first release paper 51, the second insulation sheet 220 and the thermocouple 20 are prevented from being positionally shifted. Thereafter, the intermediate positional alignment jig 42 is removed from the jig base 40.

Figure 11:
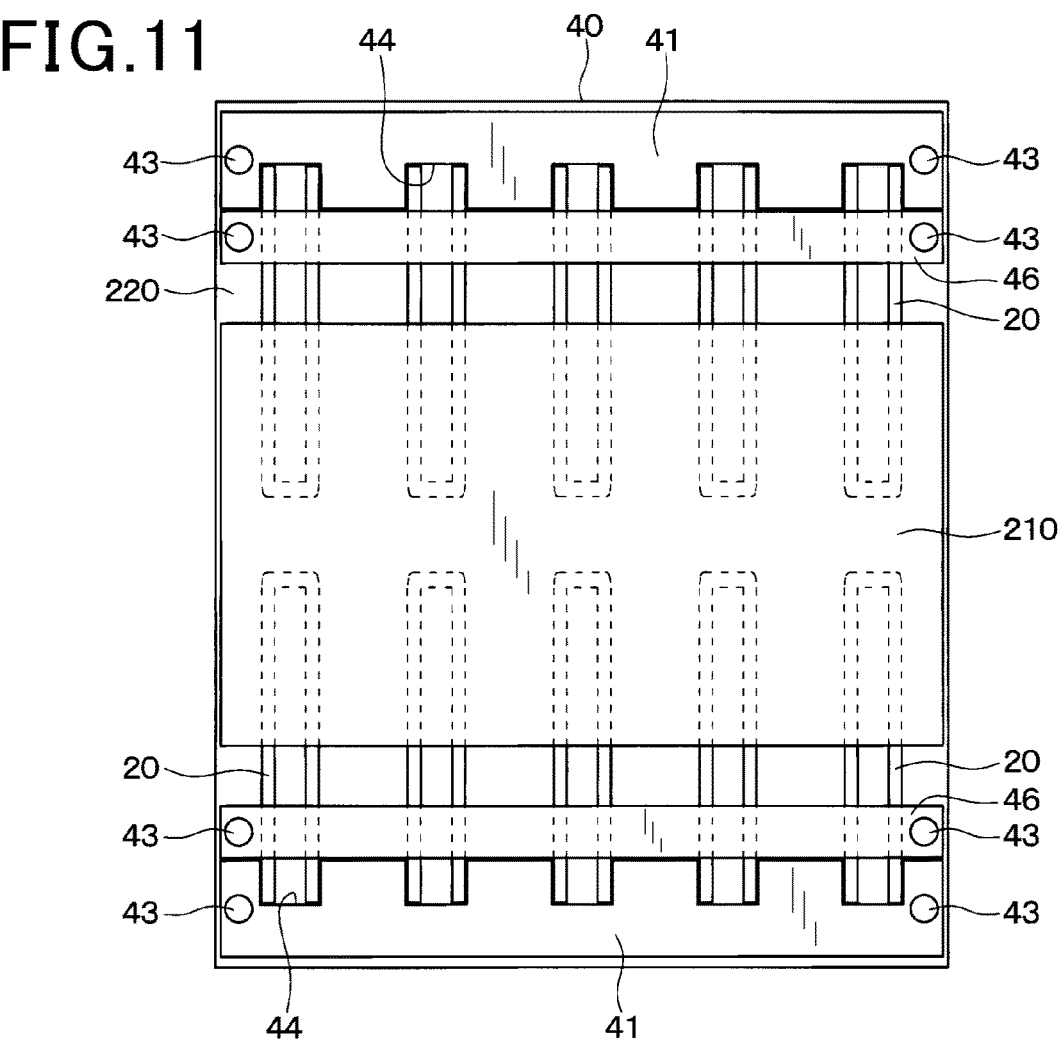
FIG. 11 is an explanatory diagram of the manufacturing method of the thermocouple sheet that composes the heat flow measurement apparatus.

Next, as shown in FIG. 11, the first insulation sheet 210 is placed on the first release sheet 51, the second insulation sheet 220 and the thermocouple 20. Thus, the laminate of the thermocouple 20 is formed. As the first insulation sheet 210, a thermo setting resin sheet or a thermo plastic resin sheet formed of aramid resin having adhesive layer on a front surface or a back surface are used.

Figure 12:
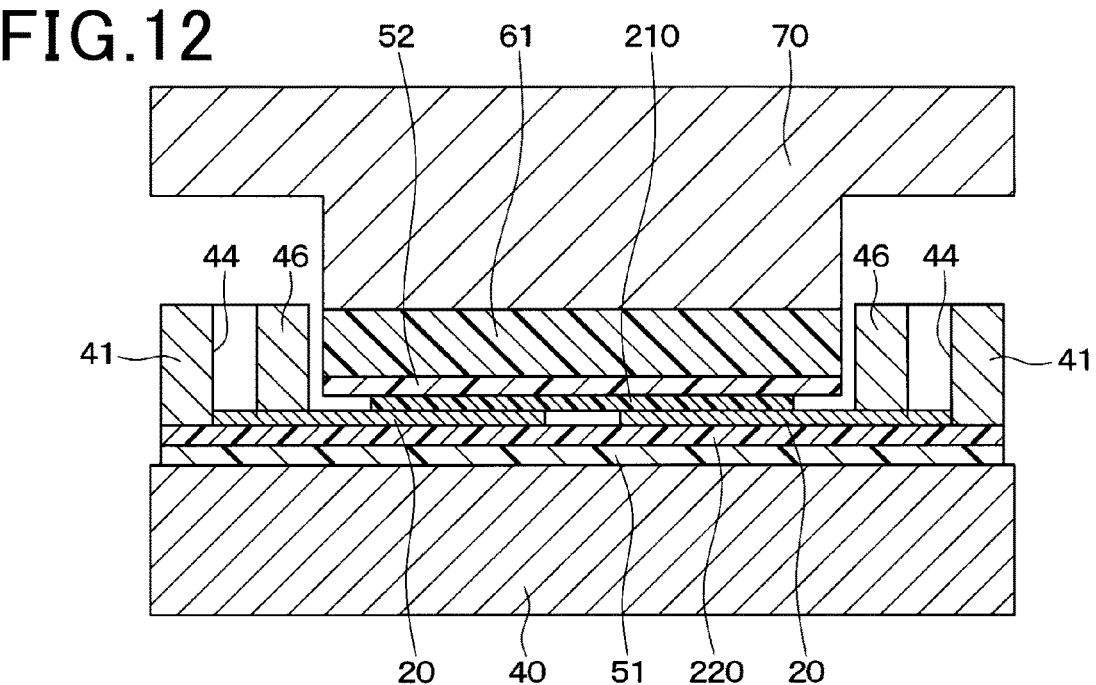
FIG. 12 is an explanatory diagram of the manufacturing method of the thermocouple sheet that composes the heat flow measurement apparatus.

Subsequently, as shown in FIG. 12, the jig base 40 is provided to a press machine 70, and a second release sheet 52 and a first cushioning 61 are further provided on the first insulation sheet 210. As the second release paper 52, a thermo setting resin sheet or a thermo plastic resin sheet formed of aramid resin or the like is used for example. As the first cushion 61, Teflon (registered trade mark) is used for example.

Next at the press process S13, the press machine 70 heats the laminate of the thermocouple 20, pressurizing the laminate in the lamination direction, thereby crimping the first insulation sheet 210, the thermocouple 20 and the second insulation sheet 220. An amount of the pressure of the press machine 70 when pressing the laminate is larger than or equal to 2 MPa, and the temperature thereof is higher than or equal to 300° C. Thus, adhesive layers included in the first insulation sheet 210 and the second insulation sheet 220 are joined to form an integrated sheet 301 shown in FIG. 13.

Figure 13:
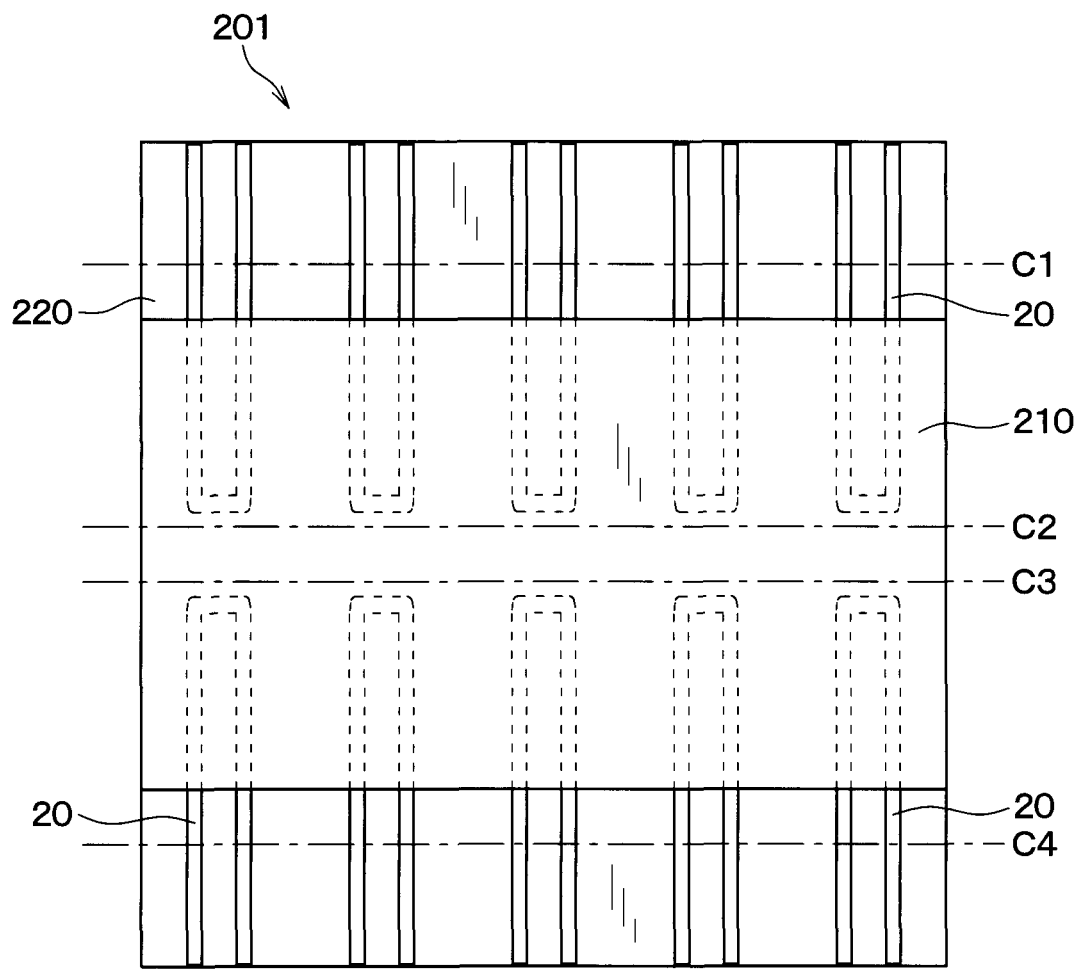
FIG. 13 is an explanatory diagram of the manufacturing method of the thermocouple sheet that composes the heat flow measurement apparatus.
Figure 14:
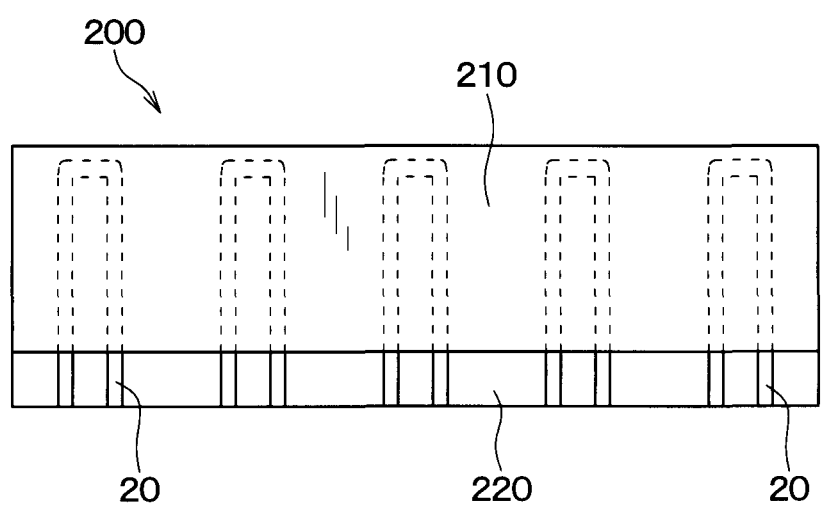
FIG. 14 is an explanatory diagram of the manufacturing method of the thermocouple sheet that composes the heat flow measurement apparatus.

Subsequently, at the cutting process S14, the integrated sheet 201 is cut at positions indicated by dashed lines C1 to C4 shown in FIG. 13. Thus, as shown in FIG. 14, the thermocouple sheet 200 is formed with a predetermined mounted dimension.

Next, in the manufacturing method of the heat flow measurement apparatus 1, the heat flux sensor member preparing process S20 will be described.

Figure 15:
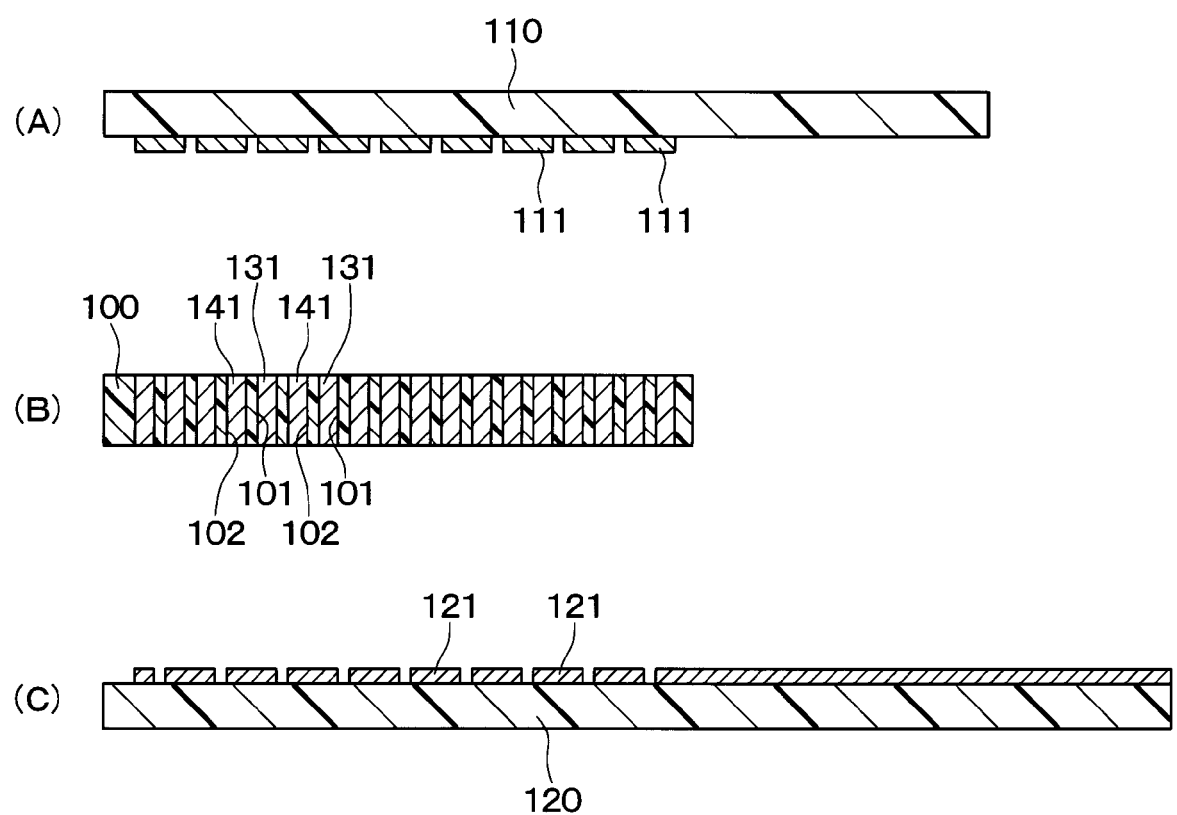
FIG. 15 is a schematic diagram showing a member of a heat flux sensor that composes the heat flow measurement apparatus.

As shown in FIGS. 15(A), (B) and (C), in the heat flux sensor member preparing step S20, the insulation substrate 100, the front surface wiring pattern 111, the front surface protective member 110, the back surface wiring pattern 121 and the back surface protective member 120 are prepared.

As shown in FIG. 15(B), the insulation substrate 100 is configured such that a plurality of types of conductive paste 131 and 141 having different thermo electric power in order to produce the heat flux sensor 100 are embedded to a plurality of via holes 101 and 102. The insulation substrate 10 may be constituted of a plurality of layers or may be constituted of a single layer.

An example of a manufacturing method of the insulation substrate 100 will be described. First, a plurality of first via holes 101 is formed in the insulation substrate 100 by a drill or laser. The first conductive paste 131 is filled into the plurality of first via holes 101 by a solid-state sintering so as to form the first interlayer connection member 130. As a method (apparatus) for filling the first conductive paste 131 into the first via holes 101, a method (apparatus) disclosed in a Japanese Patent Application No. 2010-50356 by the present applicant may be used.

To briefly explain the above-mentioned method, the insulation substrate 100 is placed on a sticky paper (not shown) provided on a holding table (not shown). Then, the first conductive paste 131 being melted is filled into the first via holes 101. Thus, most of organic solvent of the first conductive paste 131 is absorbed by the sticky paper, and the alloy powder is provided closely to the first via holes 101.

As the first conductive paste 313, a paste is used in which an organic solvent such as paraffin is added to a powder of Bi—Sb—Te alloy having a predetermined crystal structure of metal atoms.

Next, a plurality of second via holes 102 is formed in the insulation substrate 100 by a drill or laser. Each of the plurality of via holes 102 is formed to be located between two adjacent first via holes 101 among the plurality of first via holes. A second conductive paste 141 is filled into the plurality of second via holes 102 so as to form the second interlayer connection member 140 by using a solid-state sintering. Filling process of the second conductive paste 141 can be the same as that of the above-described first conductive paste 131.

As the second conductive paste 141, a paste is used in which an organic solvent such as terpine is added to a powder of Bi—Te alloy having a predetermined crystal structure of metal atoms which are different from the metal atoms constituting the first conductive paste 131. Note that paraffin or the like may be used for an organic solvent of the second conductive paste 141.

As shown in FIG. 15(A), the front surface wiring patterns 111 connect end portions of the plurality of conductive paste 131 and 141 of one side in the thickness direction of the insulation substrate 100. Also, the front surface protective member 110 covers one side surface of the insulation substrate 100 and the front surface wiring patterns 111. The front surface protective member 110 is longer than the insulation substrate 100 in the surface direction.

An example of a manufacturing method of the front surface wiring patterns 111 and the front surface protective member 110 will be described. First, copper film or the like is formed on a surface facing at least the insulation substrate 100 in the front surface protective member 110. Then, the copper film is appropriately patterned, thereby forming the front surface wiring patterns 111 on the front surface protective member 110.

As shown in FIG. 15(C), the back surface wiring patterns 121 connect end portions of the plurality of conductive paste 131 and 141 of the other side in the thickness direction of the insulation substrate 100. Also, the back surface protective member 120 covers the other side surface of the insulation substrate 100 and the back surface wiring patterns 121. The back surface protective member 120 is longer than the insulation substrate 100 and the front surface protective member 110 in the surface direction.

An example of a manufacturing method of the back surface wiring patterns 121 and the back surface protective member 120 will be described. First, copper film or the like is formed on a surface facing at least the insulation substrate 100 in the back surface protective member 120. Then, the copper film is appropriately patterned, thereby forming the back surface wiring patterns 121 on the back surface protective member 120.

Next, In the manufacturing method of the heat flux measurement apparatus 1, the laminate forming process S30 in the manufacturing processes of the heat flow measurement apparatus 1 will be described.

Figure 16:
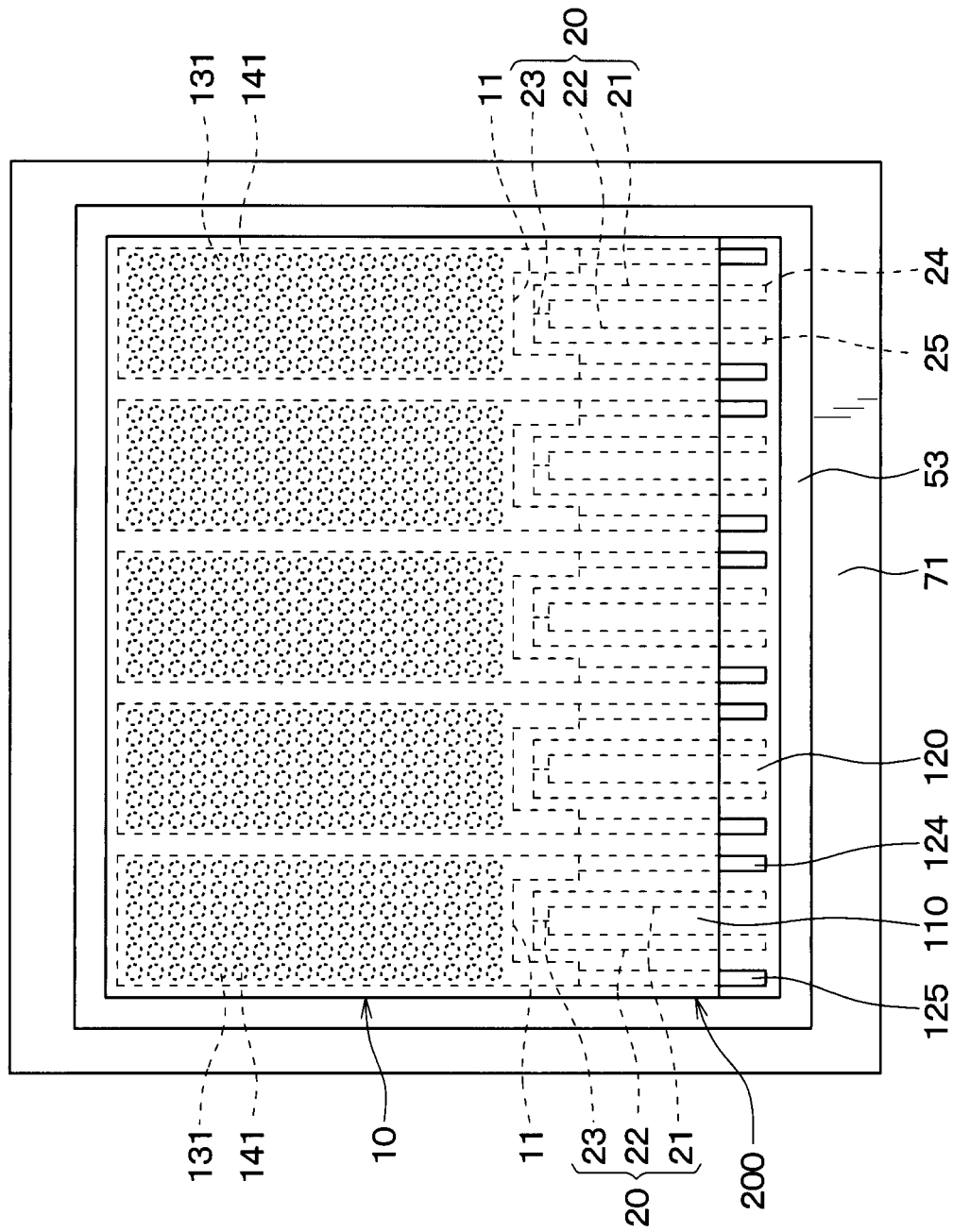
FIG. 16 is an explanatory diagram showing a manufacturing method of the heat flow measurement apparatus.
Figure 17:
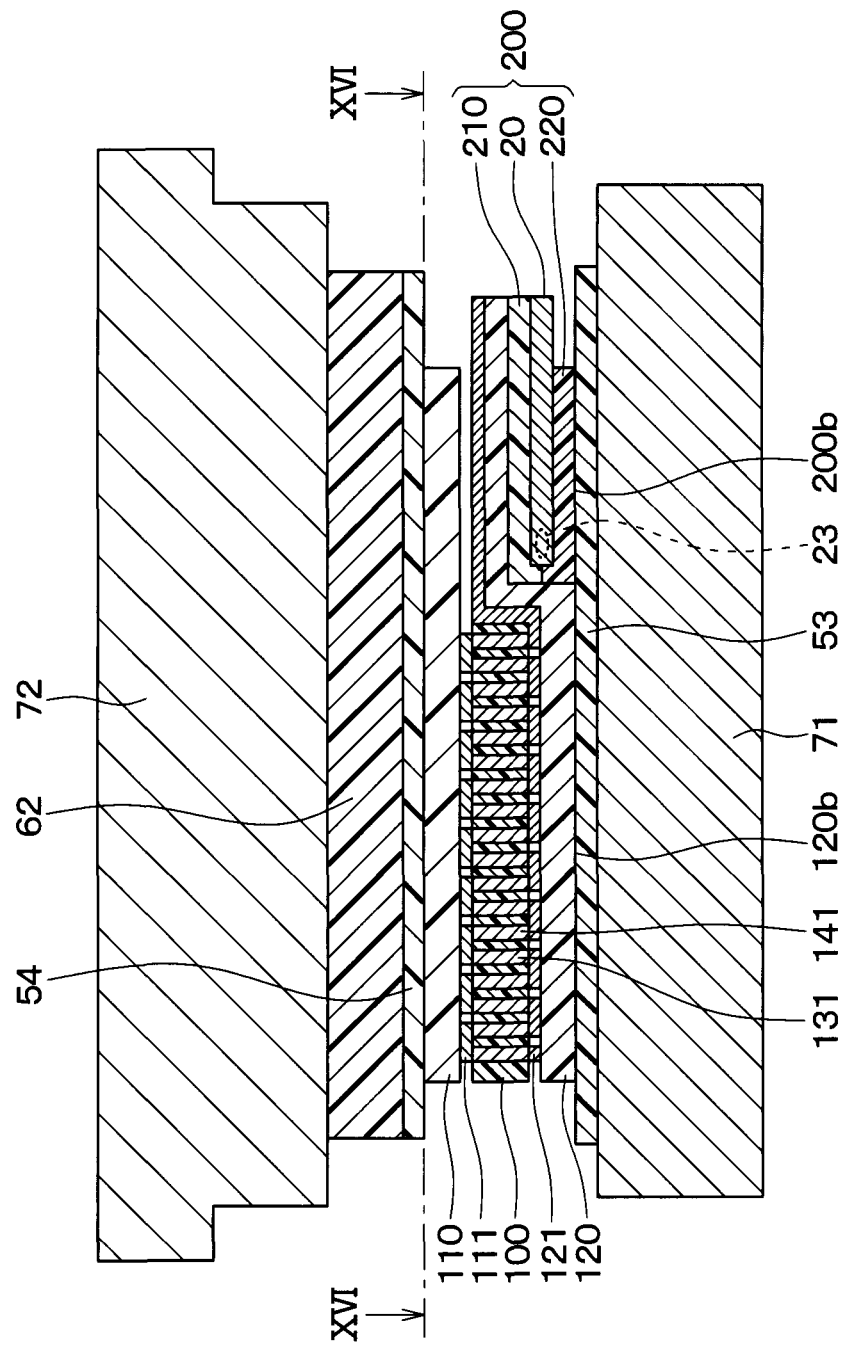
FIG. 17 is an explanatory diagram showing a manufacturing method of the heat flow measurement apparatus.

As shown in FIGS. 16 and 17, a third release paper 53 is placed on a lower press plate 71 of the press machine and the thermocouple sheet 200 shown in FIG. 14 is placed on the third release paper 53. Subsequently, the back surface protective member 120 on which the back surface wiring patterns 121 are formed, is laminated on the third release paper 53 placed in the lower press plate 71 and on the thermocouple sheet 200. Thereafter, the insulation substrate 100 and the front surface protective member 110 on which the front surface wiring patterns 111 are formed, are laminated sequentially on the back surface wiring patterns 121. Further, a fourth release paper 54 and a second cushioning 62 are placed on the front surface protective member 110. As the third and fourth release sheet 53 and 54, a thermo setting resin sheet or a thermo plastic resin sheet formed of aramid resin or the like is used for example. As the second cushioning member 62, Teflon is used for example.

Thus, the thermocouple sheet 200 is placed in a portion where the front surface protective member 110 and the back surface protective member 120 are extended from the insulation substrate 100 in the surface direction, and facing a surface of the back surface protective member 120 which is opposite to the front surface protective member 110. At this moment, a portion where at least the conductive paste 131 and 141 are arranged on the surface 120b of the back surface protective member 120, which is located opposite to the insulation substrate 100 and a portion where at least the junction 23 is arranged on the surface 200b opposite to the back surface protective member 120 in the thermocouple sheet 200 are flush with each other. Note that entire surface 120b of the back surface protective member 120, which is located opposite to the insulation substrate 100, and entire surface 200b opposite to the back surface protective member 120 in the thermocouple sheet 200 may preferably be flush with each other. Further, the junction 23 of the thermocouple 20 included in the thermocouple sheet 200 enters the concave portion 11 included in the insulation substrate 100, whereby the junction 23 and the conductive paste 131 and 141 are arranged to be close to each other. Thus, the laminate is formed in this manner.

In the present specification, a description "two portions are flush with each other" includes a state where the two portions are flush on the identical plane, and also a state where two portions are slightly shifted from each other due to fabrication tolerance or the like. Further, a description "entire surfaces are flush with each other" includes a state where the entire surfaces are flush with each on the identical plane, and also a state where the entire surfaces are slightly shifted from each other due to fabrication tolerance or the like.

Next, in the manufacturing method of the heat flux measurement apparatus 1, the integrated pressing process S40 will be described. In the integrated pressing process 40, the laminate located between the lower press plate 71 and the upper press plate 72 of the press machine is heated while being pressed in vacuo in the laminate direction. The pressure of the press machine when pressing is about 10 MPa or higher for example, and the temperature thereof is higher than or equal to 320° C. Thus, the plurality of first and second conductive paste 131 and 141 embedded into the plurality of via holes 101 and 102 of the insulation substrate 100 are solid-state sintered to become the first and second interlayer connection members 130 and 140. The first and second interlayer connection members 130 and 140, the front surface wiring pattern 111 and the back surface wiring pattern 121 are electrically connected. Further, the insulation substrate 100, the front surface protective member 110 and the back surface protective member 120 and the thermocouple sheet 200 are crimped. By this single integrated press process S40, the laminate is completed in which the heat flux sensor 10 and the thermocouple 20 are integrally formed.

Note that the plurality of heat flux measurement apparatus produced with the above-described manufacturing method is divided into a single heat flux measurement apparatus 1 in the latter process.

The above-described heat flux measurement apparatus 1 according to the first embodiment obtains effects and advantages.

(1) In the heat flux measurement apparatus 1 according to the first embodiment, the thermocouple sheet 200 is fixed to a portion where the front surface protective member 110 or the back surface protective layer 120 are extended from the insulation substrate 100 in the surface direction.

Thus, comparing with a case where the heat flux sensor 10 and the thermocouple 20 are arranged to be laminated in the thickness direction, the thickness of the heat flux measurement apparatus 1 can be thinner. Hence, when the heat flux measurement apparatus 1 is attached to the surface 3 of the measurement object 2, air flow in the vicinity of the surface 3 of the measurement object 2 can be prevented from being disturbed. Therefore, the heat flux measurement apparatus 1 is able to reduce a temperature drift due to a change in the outside temperature or the like, based on the output signal of the heat flux sensor 10 and the output signal of the thermocouple 20, so that the heat flow of the measurement object 2 can be accurately measured.

Also, the thermocouple 200 is fixed to a position where the front surface protective member 110 or the back surface protective member 120 is extended from the insulation substrate 100 in the surface direction, whereby the heat flux sensor 10 and the thermocouple 20 can be provided to be at a close position in the surface direction. Hence, each of the heat flux sensor 10 and the thermocouple 20 detects the heat flow and the temperature at almost the same position of the measurement object 2. Therefore, the signal of the thermocouple 20 corresponds to the signal of the heat flux sensor 10. As a result, the heat flow measurement apparatus 1 is able to reduce an influence of the temperature drift from the signal of the heat flux sensor 10.

(2) According to the first embodiment, the surface 120b of the back surface protective member 120, which is located opposite to the insulation substrate 100 in a portion where the interlayer connection members 130 and 140 are arranged, and the surface 200b opposite to the back surface protective member 120 in the thermocouple sheet 200 in a portion where the junction 23 is arranged, are flush with each other.

Thus, when the heat flow measurement apparatus 1 is attached to the surface 3 of the measurement object 2, it is possible that the junction 23 between the heat flux sensor 10 and the thermocouple 20 is located closely to the surface 3 of the measurement object 2 and the heat flux sensor 10 and the thermocouple sheet 200 contact with the surface 3 of the measurement object 2. Hence, the heat flow measurement apparatus 1 is able to accurately detect the heat flow characteristics of the measurement object 2, based on the output signal of the heat flux sensor 10 and the output signal of the thermocouple 20.

(3) According to the first embodiment, the thickness T1 of a portion where the thermocouple sheet is provided is within a thickness T2 of a portion where the heat flux sensor 10 is provided.

Thus, the thickness of the heat flow measurement apparatus 1 can be thinner within the thickness T2 of the heat flux sensor 10. Hence, when the heat flow measurement apparatus 1 is attached to the surface 3 of the measurement object 2, air flow in the vicinity of the surface 3 of the measurement object 2 can be prevented from being disturbed.

(4) According to the first embodiment, the junction 23 of the thermocouple 20 included in the thermocouple sheet 200 enters the concave portion 11 included in the insulation substrate 100.

Thus, according to the heat flow measurement apparatus 1, since the distance between the first and second interlayer connection portions 130 and 140 of the heat flux sensor 10, and the junction 23 of the thermocouple 20 is short, the heat flow and the temperature of the measurement object 2 can be measured at almost the same location. Therefore, the heat flow measurement apparatus 1 is able to accurately detect the heat flow characteristics of the measurement object 2, based on the output signal of the heat flux sensor 10 and the output signal of the thermocouple 20.

According to the manufacturing method of the heat flow measurement apparatus 1 of the first embodiment, the following effects and advantages can be obtained.

(5) According to the manufacturing method of the first embodiment, the thermocouple sheet 200 is placed in a position where the front surface protective member 110 and the back surface protective member 120 are extended from the insulation substrate 100 in the surface direction, and facing a surface of the back surface protective member 120 which is opposite to the front surface protective member 110, thereby forming a laminate. Then, the laminate is heated and pressurized in the laminate direction. At this moment, the conductive paste 131 and 141 are solid-state sintered to obtain the interlayer connection members 130 and 140. Further, interlayer connection members 130 and 140, the front surface wiring pattern 11 and the back surface wiring pattern 121 are electrically connected, and the insulation substrate 100 and the front surface protective member 110, the back surface protective member 120 and the thermocouple 200 are crimped. Thus, the heat flux sensor 10 and the thermocouple 20 are formed integrally.

Thus, the thickness of a portion of the heat flux sensor 10 and the thickness of the thermocouple sheet 200 included in the heat flow measurement apparatus 1 can be the same, and the thickness of the heat flow measurement apparatus 1 can be thinner. Hence, when the heat flow measurement apparatus 1 is attached to the surface 3 of the measurement object 2, air flow in the vicinity of the surface 3 of the measurement object 2 can be prevented from being disturbed. Therefore, the heat flux measurement apparatus 1 is able to reduce a temperature drift due to a change in the outside temperature or the like, based on the output signal of the heat flux sensor 10 and the output signal of the thermocouple 20, so that the heat flow of the measurement object 2 can be accurately measured.

Also, according to the manufacturing method, only one press process is applied to the insulation substrate 100, the front surface protective member 110, the back surface protective member 120 and the thermocouple sheet 200, whereby the heat flow measurement apparatus 1 can be formed. Hence, occurrence of a crease or a gap can be avoided in the insulation substrate 100, the front surface protective member 110, the back surface protective member 120 and the thermocouple sheet 200.

(6) According to the manufacturing method of the first embodiment, when performing the integrated pressing process S40 for the laminate, a portion where at least the conductive paste 131 and 141 are arranged on the surface 120b of the back surface protective member 120, which is located opposite to the insulation substrate 100 and a portion where at least the junction 23 is arranged on the surface 200b opposite to the back surface protective member 120 in the thermocouple sheet 200 are flush with each other.

Thus, when the heat flow measurement apparatus 1 is attached to the surface 3 of the measurement object 2, it is possible that the junction 23 between the heat flux sensor 10 and the thermocouple 20 is located closely to the surface 3 of the measurement object 2 and the heat flux sensor 10 and the thermocouple sheet 200 contact with the surface 3 of the measurement object 2. Hence, the heat flow measurement apparatus 1 is able to accurately detect the heat flow characteristics of the measurement object 2, based on the output signal of the heat flux sensor 10 and the output signal of the thermocouple 20.

(7) According to the manufacturing method of the first embodiment, when performing the laminate forming process S30, the junction 23 of the thermocouple 20 included in the thermocouple sheet 200 enters the concave portion 11 included in the insulation substrate 100.

Thus, according to the heat flow measurement apparatus 1, since the distance between the first and second interlayer connection portions 130 and 140 of the heat flux sensor 10, and the junction 23 of the thermocouple 20 is short, the heat flow and the temperature of the measurement object 2 can be measured at almost the same location. Therefore, the heat flow measurement apparatus 1 is able to accurately detect the heat flow characteristics of the measurement object 2, based on the output signal of the heat flux sensor 10 and the output signal of the thermocouple 20.

(8) According to the manufacturing method of the first embodiment, when the thermocouple sheet forming process S10 is performed, the laminate of the thermocouple 20 in which the first insulation sheet 210 is placed on one side of the thermocouple 20 and the second insulation sheet 220 is placed on the other side, is heated with being pressurized so as to crimp the first insulation sheet 210, the thermocouple 20 and the second insulation sheet 220.

Thus, even when thinner thermocouple 20 is used, the thermocouple can be easily handled. Hence, in the case where the thermocouple sheet 200 is placed at a portion where the front surface protective member 110 and the back surface protective member 120 are extended from the insulation substrate 100 in the surface direction, a positional alignment of the thermocouple sheet 200 with respect to the heat flux sensor 10 can be performed readily and accurately.

Second Embodiment

A second embodiment of the present invention will be described. According to the second embodiment, an arrangement of the thermocouple sheet 200 is modified from the first embodiment, and other portions are the same as those of the first embodiment. Hence, only portions differing from the first embodiments will be described.

Figure 18:
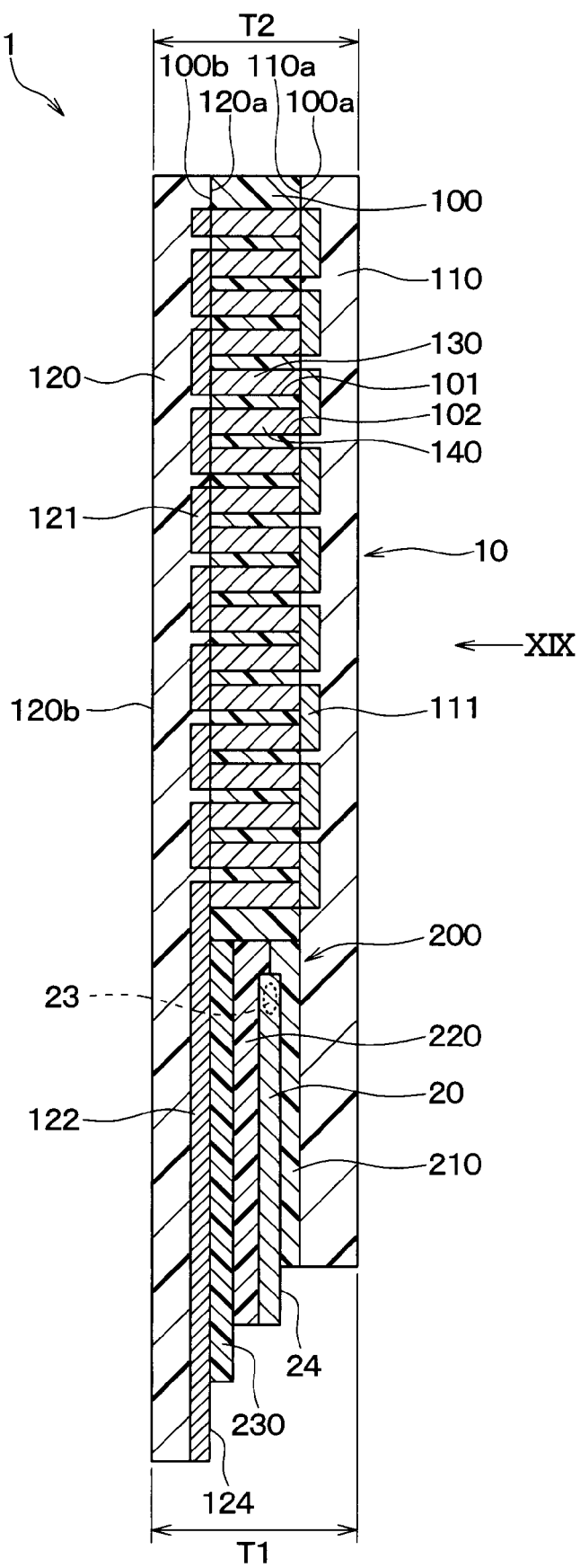
FIG. 18 is a cross-sectional view showing a heat flow measurement apparatus according to a second embodiment of the present invention.
Figure 19:
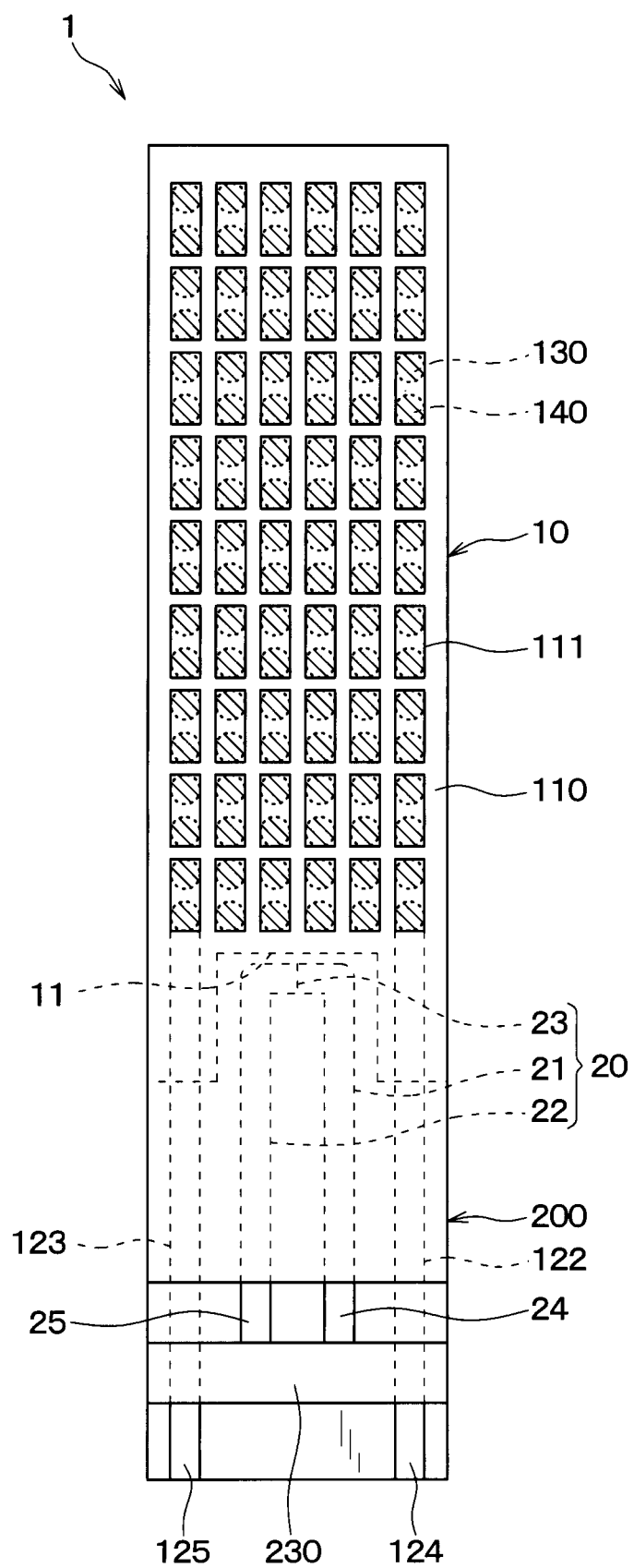
FIG. 19 is a plan view in a direction XIX shown in FIG. 18.

As shown in FIGS. 18 and 19, the thermocouple sheet 200 that constitutes the heat flow measurement apparatus 1 of the second embodiment is fixed between the front surface protective member 110 and the back surface protective member 120 in a portion where the front surface protective member 110 and the back surface protective member 120 are extended from the insulation substrate 100 in the surface direction. With this state, a surface 120b which is a surface opposite to the insulation substrate 100 in the back surface protective member 120 at a portion where the plurality of interlayer connection members 130 and 140 are located in the heat flux sensor 10, and a surface 120b which is a surface opposite to the thermocouple sheet 200 in the back surface protective member 120 at a portion where the junction 23 is located on the thermocouple sheet 200, are flush with each other.

Note that a short-circuit prevention insulation sheet 230 is provided between the thermocouple sheet 200 and the back surface protective member 130. The short-circuit prevention insulation sheet 230 prevents the pads 24 and 25 of the thermocouple 20 included in the thermocouple sheet 200, and the pads 124 and 125 in which the back surface pattern 121 is exposed from the second insulation sheet 220 included in the thermocouple sheet 200, from being short-circuited.

The total thickness of the thermocouple sheet 200 and the short-circuit prevention insulation sheet 230 is the same as that of the insulation substrate 100 or smaller. Accordingly, in the heat flow measurement apparatus 1, the thickness T1 of a portion where the thermocouple sheet 200 is provided, is within a thickness T2 of a portion where the heat flux sensor 10 is provided.

Next, a manufacturing method of a heat flow measurement apparatus 1 of the second embodiment will be described.

Similar to that of the first embodiment, the manufacturing method of the second embodiment includes a thermocouple sheet forming process S10, a heat flux sensor member preparing process S20, a laminate forming process S30 and an integrated pressing process S40. The thermocouple sheet forming process S10, the heat flux sensor member preparing step S20, and the integrated pressing process S40 are the same as processes described in the first embodiment.

Figure 20:
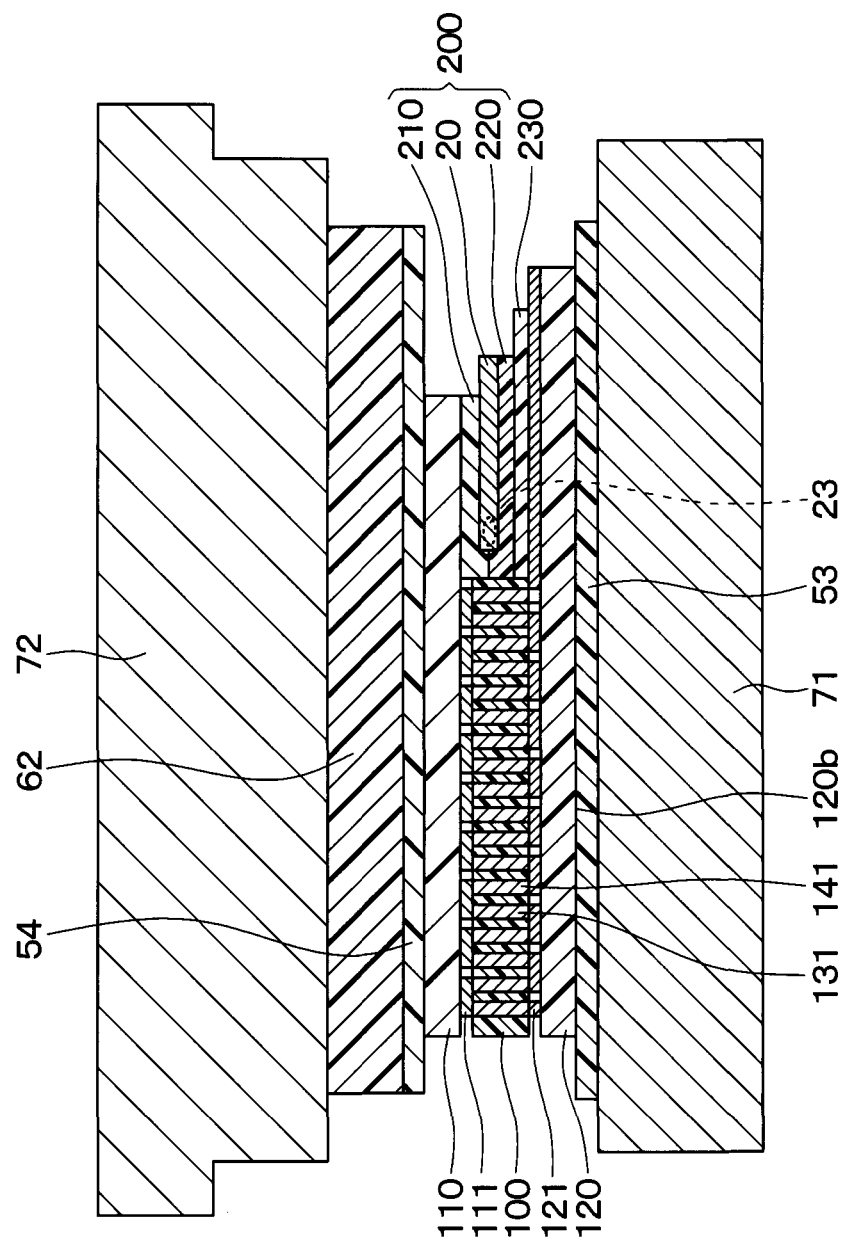
FIG. 20 is an explanatory diagram showing a manufacturing method of a heat flow measurement apparatus according to a second embodiment.

In the laminate forming process S30, as shown in FIG. 20, the back surface protective member 120 on which the back surface wiring pattern 121 is formed, is placed on the third release paper 53 placed on the lower press plate 71 of the press machine. Further, the insulation substrate 100 and the thermocouple 200 are arranged on the back surface protective member 120, and the front surface protective member 110 on which the front surface wiring pattern 111 is formed thereon, further the fourth release paper 54 and the second cushioning 62 are arranged thereon.

Thus, the thermocouple sheet 200 is placed between the front surface protective member 110 and the back surface protective member 120 in a portion where the front surface protective member 110 and the back surface protective member 120 are extended from the insulation substrate 100 in the surface direction. At this moment, a portion where at least the conductive paste 131 and 141 are arranged on the surface 120b of the back surface protective member 120, which is located opposite to the insulation substrate 100 and a portion where at least the junction 23 arranged on the surface 120b of the back surface protective member 120, which is located opposite to the thermocouple sheet 200, are almost flush with each other. Note that entire surface 120b of the back surface protective member 120, which is located opposite to the insulation substrate 100, and entire surface 120b of the back surface protective member 120, which is located opposite to the thermocouple sheet 200 may preferably be flush with each other. Further, the junction 23 of the thermocouple 20 included in the thermocouple sheet 200 enters the concave portion 11 included in the insulation substrate 100, whereby the junction 23 and the conductive paste 131 and 141 are arranged to be close to each other. Thus, the laminate is formed in this manner.

Next, in the integrated pressing process 40, the laminate located between the lower press plate 71 and the upper press plate 72 of the press machine is heated while being pressurized in vacuo in the laminate direction. Thus, the plurality of first and second conductive paste 131 and 141 embedded into the plurality of via holes 101 and 102 of the insulation substrate 100 are solid-state sintered to become the first and second interlayer connection members 130 and 140. The first and second interlayer connection members 130 and 140, the front surface wiring pattern 111 and the back surface wiring pattern 121 are electrically connected. Further, the insulation substrate 100, the front surface protective member 110 and the back surface protective member 120 and the thermocouple sheet 200 are crimped. By this single integrated press process S40, the laminate is completed in which the heat flux sensor 10 and the thermocouple 20 are integrally formed.

According to the heat flow measurement apparatus 1 of the second embodiment described above, the surface 120b of the back surface protective member 120, which is located opposite to the insulation substrate 100 in a portion where the interlayer connection members 130 and 140 are arranged, and the surface 120b opposite to the thermocouple sheet 200 in the back surface protective member 120 in a portion where the junction 23 is arranged, are flush with each other.

Also, according to this configuration, compared to a configuration in which the thermocouple 20 is stuck on the surface of the heat flux sensor 10 opposite to the measurement object 2, the junction 23 of the thermocouple 20 can be located closely to the surface 3 of the measurement object 2. Moreover, the heat flux sensor 10 and the thermocouple sheet 200 can contact with the surface 3 of the measurement object 2. Hence, the heat flow measurement apparatus 1 is able to accurately detect the heat flow characteristics of the measurement object 2, based on the output signal of the heat flux sensor 10 and the output signal of the thermocouple 20.

Third Embodiment

A third embodiment of the present invention will be described. According to the third embodiment, a configuration of the thermocouple in the thermocouple sheet 200 is modified from the first embodiment, and other portions are the same as those of the first and second embodiments. Hence, only portions differing from the first and second embodiments will be described.

Figure 21:
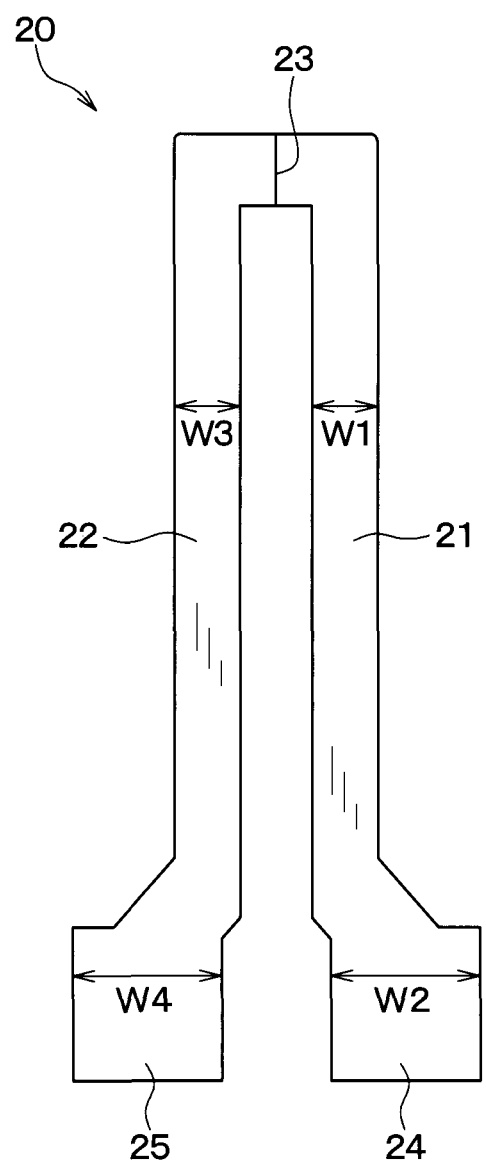
FIG. 21 is a plan view showing a thermocouple that composes a heat flow measurement apparatus according to a third embodiment of the present invention.

In FIG. 21, only the thermocouple 20 included in the thermocouple sheet 200 that constitutes the heat flow measurement apparatus 1 is shown. The thermocouple 20 is composed of a first conductor 21 and a second conductor 22 which are joined to each other. Respective first and second conductor 21 and 22 are configured of metallic foil having mutually different thermoelectric power. A portion where the first conductor 21 and the second conductor 22 are joined serves as a joint 23 to detect the temperature. The first conductor 21 includes a first pad 24 used for wiring connection at an end portion located opposite to the junction 23. Also, the second conductor 22 includes a second pad 25 used for wiring connection at an end portion located opposite to the junction 23. In the thermocouple 20 according to the third embodiment, the width W1 of the first conductor 21 excluding the first pad 24 is thinner than the width W2 of the first pad 24. Also, the width W3 of the second conductor 22 excluding the second pad 25 is thinner than the width W4 of the second pad 25. The thermocouple 20, when a temperature difference is produced between the junction 23 and the detecting portion 30, outputs the thermo-electromotive force produced at the junction 23 due to Seebeck effect, as the sensor signal.

In the third embodiment, according to the above-described configuration, the heat capacity of the first conductor 21 excluding the first pad 24 can be small, and the heat capacity of the second conductor 22 excluding the second pad 25 can be small. Hence, in the thermocouple 20, when the temperature difference is produced between the junction 23 and the detecting portion 30, the heat at the junction 23 can be prevented from propagating to the first conductor 21 and the second conductor 22. Therefore, since a decrease in the thermo-electromotive force produced in the junction 23 because of heat transfer from the junction 23 to the first conductor 21 and the second conductor 22 can be avoided, the thermocouple 20 is able to detect the temperature of the junction 23 accurately.

Note that also in the third embodiment, similar to the first and second embodiments, the first insulation sheet 210 and the second insulation sheet 220 covers the thermocouple 20 from both sides, whereby the thermocouple sheet 200 is formed. Hence, even when the width W1 of the first conductor 21 excluding the first pad 24 and the width W3 of the second conductor 22 excluding the second pad 25 are set to be thinner, the thermocouple 200 can readily be handled. Hence, in the case where the thermocouple sheet 200 is placed at a portion where the front surface protective member 110 and the back surface protective member 120 are extended from the insulation substrate 100 in the surface direction, a positional alignment of the thermocouple sheet 200 with respect to the heat flux sensor 10 can be performed readily and accurately.

Fourth Embodiment

A fourth embodiment of the present invention will be described. According to the fourth embodiment, a configuration of the thermocouple 20 in the thermocouple sheet 200 is modified from the first embodiment, and other portions are the same as those of the first and second embodiments. Hence, only portions differing from the first and second embodiments will be described.

Figure 22:
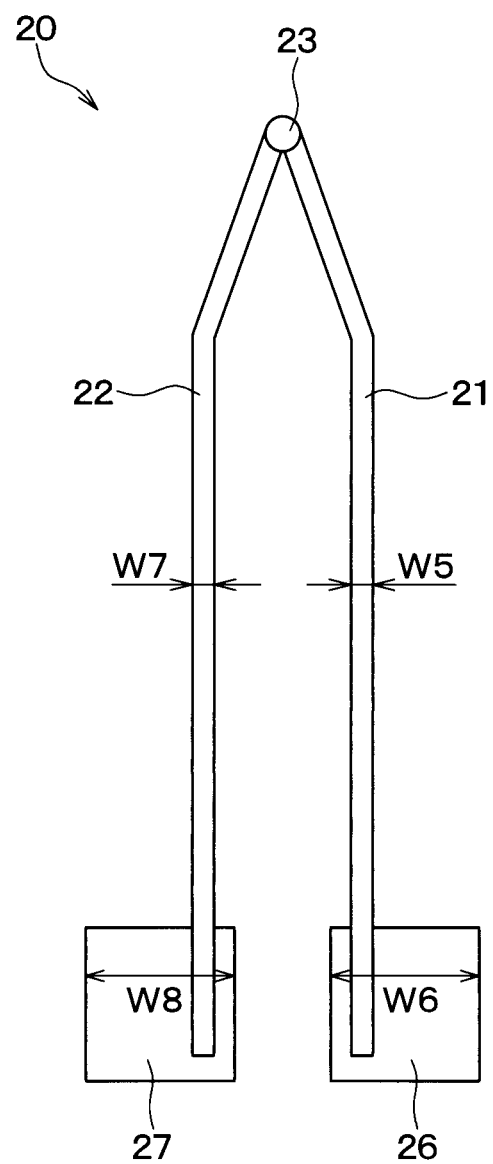
FIG. 22 is a plan view showing a thermocouple that composes a heat flow measurement apparatus according to a fourth embodiment of the present invention.

In FIG. 22, only the thermocouple 20 is shown, which is included in the thermocouple sheet 200 that constitutes the heat flow measurement apparatus 1. The thermocouple 20 is configured such that the first conductor 21 and the second conductor 22 constituted of linear-shaped members having mutually different thermoelectric power are joined by welding or the like. A portion where the first conductor 21 and the second conductor 22 are joined serves as the joint 23 that detects the temperature. The first conductor 21 includes a first pad 26 used for wiring connection at an end portion opposite to the joint 23, which is attached thereto by welding or the like. The second conductor 22 includes a second pad 27 used for wiring connection at an end portion opposite to the joint 23, which is attached thereto by welding or the like. The width W5 of the first conductor 21 constituted of the linear-shaped member is thinner than the width W6 of the first pad 26. The width W7 of the second conductor 22 constituted of the linear-shaped member is thinner than the width W8 of the second pad 27. The thermocouple 20, when temperature difference is produced between the junction 23 and the detecting portion 30, outputs thermo-electromotive force generated at the junction 23 due to the Seebeck effect, as the sensor signal.

In the fourth embodiment, with the above-described configuration, the heat capacity of the first conductor 21 can be small and the heat capacity of the second conductor 22 can be small. Hence, in the thermocouple 20, when the temperature difference is produced between the junction 23 and the detecting portion 30, the heat at the junction 23 can be prevented from propagating to the first conductor 21 and the second conductor 22. Therefore, since a decrease in the thermo-electromotive force produced in the junction 23 because of heat transfer to the first conductor 21 and the second conductor 22 can be avoided, the thermocouple 20 is able to detect the temperature of the junction 23 accurately.

Note that also in the fourth embodiment, similar to the first to third embodiments, the first insulation sheet 210 and the second insulation sheet 220 covers the thermocouple 20 from both sides thereof, whereby the thermocouple sheet 200 is formed. Hence, even when the width W5 of the first conductor 21 and the width W7 of the second conductor 22 are set to be thinner, the thermocouple 200 can readily be handled. Hence, in the case where the thermocouple sheet 200 is placed at a portion where the front surface protective member 110 and the back surface protective member 120 are extended from the insulation substrate 100 in the surface direction, a positional alignment of the thermocouple sheet 200 with respect to the heat flux sensor 10 can be performed readily and accurately.

Other Embodiments

The present invention is not limited to the above-described embodiments. However, the present invention can be appropriately modified within a scope of claims. Also, the above-described respective embodiments are not mutually unrelated, but can be appropriately combined except a case where combination is apparently impossible. Further, in the above-described embodiments, needless to say, elements which constitute the embodiments are not necessary except that the elements are clearly indicated as necessary and elements are theoretically and apparently necessary. Further, in the above-described respective embodiments, in the case where the number of elements of the embodiment, numerical values, quantity, numerical value of range or the like are mentioned, it is not limited to the specific number except that the number is clearly indicated as necessary and the number is theoretically and apparently limited to specific number. Further, in the above-described respective embodiments, when shape, positional relationship of elements is mentioned, it is not limited to the shape or the positional relationship except that specific shape or positional relationship is clearly indicated and limited thereto.

For example, according to the above-described embodiments, in order to the heat flow measurement apparatus, the heat flow measurement apparatus is attached to the surface of the measurement object. However, the heat flow measurement apparatus may be disposed inside the measurement object.

(Summary)

According to a first view represented by a part of or whole above-described embodiments, a heat flow measurement apparatus includes a heat flux sensor and a thermocouple sheet.

The heat flux sensor includes an insulation substrate having a plate shape, a plurality of conductors composed of metals having mutually different thermoelectric power and embedded into a plurality of via holes penetrating in a thickness direction of the insulation substrate, a front surface wiring pattern that connects end portions of the plurality of conductors on one side of the insulation substrate in a thickness direction thereof, a back surface wiring pattern that connects end portion of the plurality of conductors on the other side of the insulation substrate in the thickness direction thereof, a front surface protective member that covers one surface of the insulation substrate in the thickness direction and the front surface wiring pattern, and a back surface protective member that covers the other surface of the insulation substrate in the thickness direction and the back surface wiring pattern, the flux sensor detecting a heat flux flowing between the one surface and the other surface in the thickness direction.

The thermocouple sheet includes a thermocouple having a joint in which a first conductor and a second conductor are joined, the first and second conductors being metals having mutually different thermoelectric power, a first insulation sheet that covers the thermocouple from one side in a direction intersecting a direction along which the first conductor and the second conductor are arranged, and a second insulation sheet that covers the thermocouple from a side opposite to the first insulation sheet, the thermocouple detecting temperature of the junction.

The thermocouple sheet is fixed to a portion where the front surface protective member and the back surface protective member extend in a surface direction from the insulation substrate.

According to a second view, the thermocouple sheet is fixed to the back surface protective member at a surface opposite to the front surface protective member in a portion where the front surface protective member and the back surface protective member extend in the surface direction from the insulation substrate. A first surface and a second surface are flush with each other, where the first surface is a surface opposite to the insulation substrate in the back surface protective member at a portion where the plurality of conductors are located in the heat flux sensor, and a second surface is a surface opposite to the back surface protective member in the thermocouple sheet at a portion where the junction is located.

Thus, when the heat flow measurement apparatus is attached to the surface of the measurement object, it is possible that the junction between the heat flux sensor and the thermocouple is located closely to the surface of the measurement object and the heat flux sensor, and the thermocouple sheet contact with the surface of the measurement object. Hence, the heat flow measurement apparatus is able to accurately detect the heat flow characteristics of the measurement object, based on the output signal of the heat flux sensor and the output signal of the thermocouple.

According to a third view, the thermocouple sheet is fixed between the front surface protective member and the back surface protective member in a portion where the front surface protective member and the back surface protective member extend in the surface direction from the insulation substrate. Moreover, a first surface and a second surface are flush with each other, where the first surface is a surface opposite to the insulation substrate in the back surface protective member at a portion where the plurality of conductors are located in the heat flux sensor, and a second surface is a surface opposite to the thermocouple sheet in the back surface protective member at a portion where the junction is located.

According to this configuration, compared to a configuration in which the thermocouple is stuck on the surface of the heat flux sensor opposite to the measurement object, the junction of the thermocouple can be located closely to the surface of the measurement object. Moreover, the heat flux sensor and the thermocouple sheet can contact with the surface of the measurement object. Hence, the heat flow measurement apparatus is able to accurately detect the heat flow characteristics of the measurement object, based on the output signal of the heat flux sensor and the output signal of the thermocouple.

According to a fourth view, a thickness at a portion where the thermocouple sheet is provided, is within a range of a thickness at a portion where the heat flux sensor is provided.

Thus, the thickness of the heat flow measurement apparatus can be thinner within the thickness of the heat flux sensor. Hence, when the heat flow measurement apparatus is attached to the surface of the measurement object, air flow in the vicinity of the surface of the measurement object can be prevented from being disturbed.

According to a fifth view, the insulation substrate includes a concave portion recessed to a conductor side from an edge of a thermocouple sheet side.

The junction of the thermocouple included in the thermocouple sheet enters the concave portion included in the insulation substrate.

Thus, since the distance between the conductors of the heat flux sensor, and the junction of the thermocouple is short, the heat flow and the temperature of the measurement object can be measured at almost the same location. Therefore, the heat flow measurement apparatus is able to accurately detect the heat flow characteristics of the measurement object, based on the output signal of the heat flux sensor 10 and the output signal of the thermocouple.

According to a sixth view, the first conductor and the second conductor of the thermocouple are configured of metallic foil. The first conductor includes a first pad at an end portion located opposite to the junction. The second conductor includes a second pad at an end portion located opposite to the junction. A width of the first conductor excluding the first pad is thinner than a width of the first pad. A width of the second conductor excluding the second pad is thinner than a width of the second pad.

Thus, the heat capacity of the first conductor excluding the first pad can be small, and the heat capacity of the second conductor excluding the second pad can be small. Hence, the heat at the junction can be prevented from propagating to the first conductor and the second conductor. Accordingly, the thermocouple is able to detect the temperature of the junction accurately.

According to the seventh view, the first conductor and the second conductor of the thermocouple is configured of linear-shaped members. The first conductor includes a first pad attached thereto at an end portion opposite to the joint. The second conductor includes a second pad attached thereto at an end portion opposite to the joint.

Thus, since the heat capacity of the first conductor and the second conductor are small, the heat at the junction can be prevented from propagating to the first conductor and the second conductor. Accordingly, the thermocouple is able to detect the temperature of the junction accurately.

What is claimed is:

1. A heat flow measurement apparatus comprising:
a heat flux sensor including:
an insulation substrate having a plate shape, a plurality of conductors composed of metals having mutually different thermoelectric powers and embedded into a plurality of via holes penetrating in a thickness direction of the insulation substrate,
a front surface wiring pattern that connects end portions of the plurality of conductors on one side of the insulation substrate in a thickness direction thereof,
a back surface wiring pattern that connects end portion of the plurality of conductors on the other side of the insulation substrate in the thickness direction thereof,
a front surface protective member that covers one surface of the insulation substrate in the thickness direction and the front surface wiring pattern, and
a back surface protective member that covers the other surface of the insulation substrate in the thickness direction and the back surface wiring pattern, the flux sensor detecting a heat flux flowing between the one surface and the other surface in the thickness direction; and
a thermocouple sheet including:
a thermocouple having a joint in which a first conductor and a second conductor are joined, the first and second conductors being metals having mutually different thermoelectric power,
a first insulation sheet that covers the thermocouple from one side in a direction intersecting a direction along which the first conductor and the second conductor are arranged, and
a second insulation sheet that covers the thermocouple from a side opposite to the first insulation sheet, the thermocouple detecting temperature of the junction,
wherein
the thermocouple sheet is fixed to a portion of the heat flux sensor where the front surface protective member and the back surface protective member extend in a surface direction from the insulation substrate.

2. The heat flow measurement apparatus according to claim 1, wherein
the thermocouple sheet is fixed to the back surface protective member at a surface opposite to the front surface protective member at the portion of the heat flux sensor where the front surface protective member and the back surface protective member extend in the surface direction from the insulation substrate;
the back surface protective member further includes an external surface that is oriented to face away from the insulation substrate and the plurality of conductors in the heat flux sensor;
the second insulation sheet further includes an external surface that is oriented to face away from the thermocouple; and
the external surface of the back surface protective member is flush with the external surface of the second insulation sheet.

3. The heat flow measurement apparatus according to claim 1, wherein
the thermocouple sheet is fixed between the front surface protective member and the back surface protective member at the portion of the heat flux sensor where the front surface protective member and the back surface protective member extend in the surface direction from the insulation substrate; and
the back surface protective member further includes an external surface that is oriented to face away from the insulation substrate and the plurality of conductors in the heat flux sensor;
the second insulation sheet further includes an external surface that is oriented to face away from the thermocouple; and
the external surface of the back surface protective member is flush with the external surface of the second insulation sheet.

4. The heat flow measurement apparatus according to claim 1, wherein
a thickness at a portion where the thermocouple sheet is provided, is within a range of a thickness at a portion where the heat flux sensor is provided.

5. The heat flow measurement apparatus according to claim 1, wherein
the insulation substrate includes a concave portion recessed to a conductor side from an edge of a thermocouple sheet side; and the junction of the thermocouple included in the thermocouple sheet enters the concave portion included in the insulation substrate.

6. The heat flow measurement apparatus according to claim 1, wherein
the first conductor and the second conductor of the thermocouple are configured of metallic foil;
the first conductor includes a first pad at an end portion located opposite to the junction;
the second conductor includes a second pad at an end portion located opposite to the junction;
a width of the first conductor excluding the first pad is thinner than a width of the first pad; and
a width of the second conductor excluding the second pad is thinner than a width of the second pad.

7. The heat flow measurement apparatus according to claim 1, wherein
the first conductor and the second conductor of the thermocouple is configured of linear-shaped members;
the first conductor includes a first pad attached thereto at an end portion opposite to the joint; and
the second conductor includes a second pad attached thereto at an end portion opposite to the joint.

* * * * *